US006922796B1

(12) United States Patent
Matena et al.

(10) Patent No.: US 6,922,796 B1
(45) Date of Patent: Jul. 26, 2005

(54) METHOD AND APPARATUS FOR PERFORMING FAILURE RECOVERY IN A JAVA PLATFORM

(75) Inventors: Vladimir Matena, Redwood City, CA (US); Rahul Sharma, San Jose, CA (US); Masood Mortazavi, Cupertino, CA (US); Sanjeev Krishnan, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 752 days.

(21) Appl. No.: 09/833,856

(22) Filed: Apr. 11, 2001

(51) Int. Cl.$^7$ .......................... G06F 11/00; G01R 31/28
(52) U.S. Cl. ......................................... 714/48; 717/124
(58) Field of Search ........................... 714/48, 6–8, 13, 714/15, 26, 42, 47, 38, 39, 2; 717/124, 126, 127, 154

(56) References Cited

U.S. PATENT DOCUMENTS

| | | | |
|---|---|---|---|
| 5,673,386 A | | 9/1997 | Batra |
| 5,748,882 A | | 5/1998 | Huang |
| 5,778,369 A | | 7/1998 | Wilson et al. |
| 6,012,149 A | * | 1/2000 | Stavran ........................ 714/2 |
| 6,182,086 B1 | | 1/2001 | Lomet et al. |
| 6,367,029 B1 | * | 4/2002 | Mayhead et al. .............. 714/2 |
| 6,480,944 B2 | * | 11/2002 | Bradshaw et al. .......... 711/162 |
| 6,550,024 B1 | * | 4/2003 | Pagurek et al. ............... 714/47 |
| 6,594,774 B1 | * | 7/2003 | Chapman et al. .............. 714/2 |
| 6,609,217 B1 | * | 8/2003 | Bonissone et al. ............ 714/26 |
| 6,618,817 B1 | * | 9/2003 | Armstrong ..................... 714/4 |
| 6,625,751 B1 | * | 9/2003 | Starovic et al. ............... 714/11 |

OTHER PUBLICATIONS

Klemm, R. et al: "Enhancing Java Server Availability With JAS" Software Practice & Experience, John Wiley & Sons Ltd. Chichester, GB, vol. 31, No. 7, Mar. 16, 2001, pp. 697–716, XP001060148 ISSN: 0038–0644 abstract; figure 3, p. 698, paragraph 4—p. 700, paragraph 4—p. 701, paragraph 2—p. 702, paragraph 5—P. 705, paragraph 4—p. 709, paragraph 4.

Maffeis Silvano: "Piranha: A COBRA tool for high availability" Computer, IEEE Computer Society, Long Beach, CA, US, US, vol. 30, No. 4, Apr. 1997, pp. 59–66, XP002162926 ISSN: 0018–9162 p. 60–p. 62.

"Method to Correlate Error Report to Source Code" IBM Technical Disclosure Bulletin, IBM Corp. New York, US, vol. 29, No. 12, May 1, 1987, p. 5315 XP000714424 ISSN: 0018–8689 the whole document.

Richard G G III et al.: "On patterns for practical fault tolerant software in Java" Reliable Distributed Systems, 1998. Proceedings. Seventeenth IEEE Symposium on West Lafayette, IN, USA Oct. 20–23, 1998, Los Alamitos, CA, USA, IEEE Comput. Soc, US, Oct. 20, 1998, pp. 144–150, XP010319078 ISBN: 0–8186–9218–9 abstract paragraph '0003.

* cited by examiner

Primary Examiner—Nadeem Iqbal
(74) Attorney, Agent, or Firm—Martine & Penilla, LLP

(57) ABSTRACT

An invention is disclosed for performing failure recovery in a Java platform. An application is executed that includes a service module and a control module. The control module includes application-specific polices for the application. When an error is detected in a system component, the detected error is reported to a runtime executive, and the system component is isolated. The control module is then notified of the system component failure.

22 Claims, 22 Drawing Sheets

METHOD AND APPARATUS FOR PERFORMING FAILURE RECOVERY IN A JAVA PLATFORM

CROSS REFERENCE TO RELATED APPLICATIONS

This application is related to (1) U.S. patent application Ser. No. 09/812,536 filed Mar. 19, 2001, and "Method and Apparatus for Providing Application Specific Strategies to a Java Platform including Start and Stop Policies," (2) U.S. patent application Ser. No. 09/812,537 filed Mar. 19, 2001, and "Method and Apparatus for Providing Application Specific Strategies to a Java Platform including Load Balancing Policies," (3) U.S. patent application Ser. No. 09/833,845 filed Apr. 11, 2001, and entitled "Method and Apparatus for Performing Online Application Upgrades in A Java Platform," (4) U.S. patent application Ser. No. 09/818,214 filed Mar. 26, 2001, and entitled "Method and Apparatus for Managing Replicated and Migration Capable Session State for A Java Platform," and (5) U.S. patent application Ser. No. 09/825,249 filed Apr. 2, 2001, and entitled "Method and Apparatus for Partitioning of Managed State for a Java based Application." Each of the above related application are incorporated herein be reference.

BACKGROUND OF THE INVENTION

1. Field of the Invention

This invention relates generally to JAVA programming, and more particularly to methods for providing failure recovery in a Java environment.

2. Description of the Related Art

Today's world of computer programming offers many high-level programming languages. Java, for example, has achieved widespread use in a relatively short period of time and is largely attributed with the ubiquitous success of the Internet. The popularity of Java is due, at least in part, to its platform independence, object orientation and dynamic nature. In addition, Java removes many of the tedious and error-prone tasks which must be performed by an application programmer, including memory management and cross-platform porting. In this manner, the Java programmer can better focus on design and functionality issues.

One particular JAVA environment is the Java 2 platform, Enterprise Edition (J2EE), which facilitates building Web-based applications. Broadly speaking, J2EE services are performed in the middle tier between the user's browser and the databases and legacy information systems. J2EE comprises a specification, reference implementation and a set of testing suites. J2EE further comprises Enterprise JavaBeans (EJB), JavaServer Pages (JSP), Java servlets, and a plurality of interfaces for linking to information resources in the platform.

The J2EE specifications define how applications should be written for the J2EE environment. Thus the specifications provide the contract between the applications and the J2EE platform. However, there exist a class of JAVA applications that require customization of the J2EE platform. These applications generally utilize application specific strategies created by a particular vendor to accomplish specific tasks that are not provided by the general JAVA platform on which the application executes. Examples of this class of JAVA applications include telecommunications applications and services that are deployed within a particular service provider's environment. This class of applications typically requires continuous availability, which means the environment in which the applications operate requires the applications to be available most of the time.

FIG. 1 is a block diagram showing a prior art J2EE environment 100. The J2EE environment 100 includes a platform 102, which is generally provided by the user of the J2EE environment 100. The platform 102 generally includes the hardware and operating system on which J2EE applications will execute. Present on the platform 102 are an application client container 104, a web container 106, and an enterprise JavaBeans container 108.

Using the J2EE environment 100, application developers can create JAVA applications 110 using EJB, Java servlets, or application clients, which then execute in the appropriate container 104, 106, and 108. An advantage of the J2EE environment 100 is that the applications 110 can be simple since the application developer does not need to be concerned about transactions and other system-level programming concepts. These aspects are handled by the containers 104–108 of the J2EE environment 100.

However, as mentioned above there exist a class of programs that require developers to provide application-specific policies to the applications 110. Unfortunately, the prior art J2EE environment 100 does not allow developers to provide these application-specific polices without breaking the basic JAVA paradigm, which define how a particular application 110 will interact with specific aspects of the underlying platform 102.

Practically speaking, it is difficult to include application-specific policies within a generic Java platform itself because there generally is no prior knowledge of what specific policies any particular application will need. Thus, vendors have individually configured their Java platforms to include application-specific policies 112 that will be needed by the particular programs executing on that particular vendor's platform 102. However, when this type of individual configuration is done, the platform 102 is still unable to execute applications that need application-specific polices that were not built into the particular vendor's platform. Further, conventional J2EE platforms do not define a mechanism for failure recovery. Many service-provider environments require the platform to provide mechanisms that mask software failures to any clients using the services implemented as a J2EE application.

In view of the foregoing, there is a need for systems and methods that provide failure recovery that allow a system to quickly recovery from any type of software failure, including application failure and the failure of the platform itself. The methods should also provide recovery generally without any detectable impact on the clients using the platform. In addition, the state of the application before failure should be preserved after recovery.

SUMMARY OF THE INVENTION

Broadly speaking, the present invention fills these needs by providing a control module, executed as part of an application, that includes application-specific strategies for the application, yet can be coded using the JAVA programming language. Using the control module, the embodiments of the present invention can be used in service-provider environments that require the Java platform to mask software failures to clients using the services of the Java applications.

In one embodiment, a method is disclosed for performing failure recovery in a Java platform. Initially, an application is executed that includes a service module and a control module. The control module includes application-specific polices for the application. Once an error is detected in a system component, the detected error is reported to a runtime executive, and the system component is isolated. The control module is then notified of the system component failure.

Another method is disclosed for performing failure recovery in a Java platform in further embodiment of the present invention. An application that includes a service module and a control module is executed on a first Java server. As before, the control module includes application-specific polices for the application. When an error is detected in a system component, the control module determines which modules are affected by the detected error, and the affected modules are restarted on a second Java server using the control module. Generally, a new module is allocated to the second Java server for each module affected by the detected error, and states of the modules affected by the detected error are loaded for the new modules from a repository.

In a further embodiment, a system for performing failure recovery in a Java platform is disclosed. The system includes an application having a service module and a control module, wherein the control module includes application-specific polices for the application. In addition, an error correlator is included that is capable of determining which system component includes a reported error. A runtime executive is also included that is in communication with the application and the error correlator. When an error occurs, the error correlator reports the system component having the reported error to the runtime executive, and the runtime executive isolates the system component. The runtime executive can also notify the control module of the system component failure, and the control module can determine which modules are affected by the detected error. The control module can then restart the modules affected by the detected error by creating a new module on a second Java server for each module affected by the detected error.

Advantageously, the embodiments of the present invention allow recovery to occur generally without any detectable impact on the clients using the application services. Moreover, the embodiments of the present invention preserve the state of the application before the failure after the failure occurs. Further, the control module of the embodiments of the present invention allows application developers to create and interface code-based application-specific strategies for applications, yet allow the service module to remain compatible with existing Java programs. The application-specific strategies can include start, stop, load balancing, failure recovery, and other code-controlled strategies specific to the particular application for which they are designed.

Moreover, applications executing on the Java system of the embodiments of the present invention can, in some embodiments, achieve continuous availability, on the order of about 99.9999% uptime or better. Other aspects and advantages of the invention will become apparent from the following detailed description, taken in conjunction with the accompany drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for systems and methods that perform failure recovery in a Java platform. To this end, embodiments of the present invention provide a control module, executed as part of an application, that facilitates failure recovery with little impact on clients using the services provided by the Java platform. When a failure occurs, the system determines, typically using an application-provided error correlator code, which component(s), caused the failure. The system then declares the component that caused the error as "failed," and quickly isolates the failed component such that the failure does not spread to other components. Thus, the system makes the component failfast. The system then notifies the component's parent control module of the component failure.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

As discussed in greater detail subsequently, the control module of the embodiments of the present invention allows application developers to provide application-specific strategies to their applications without needing to alter the JAVA platform itself, using the JAVA programming language. Thus, developers can define start and stop polices, load balancing policies, failure recovery polices, and other application-specific strategies and policies, as will be apparent to those skilled in the art.

In particular, the embodiments of the present invention can be used in service-provider environments that require the Java platform to mask software failures to the clients using services implemented as Java applications. Using the embodiments of the present invention, a system can quickly recover from software failures, including application failure. Advantageously, the embodiments of the present invention allow recovery to occur generally without any detectable impact on the clients using the application services. Moreover, the embodiments of the present invention preserve the state of the application before the failure after the failure occurs.

Figure 1:
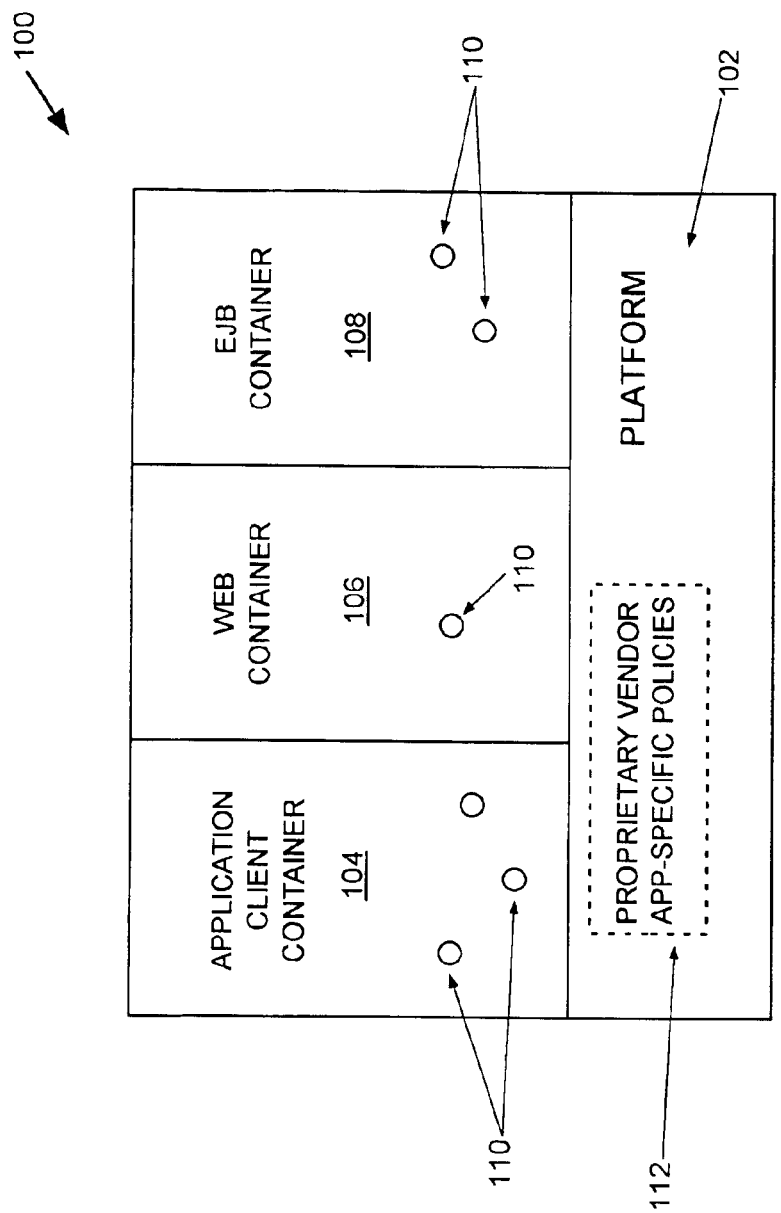
FIG. 1 is a block diagram showing a prior art J2EE environment.
Figure 2:
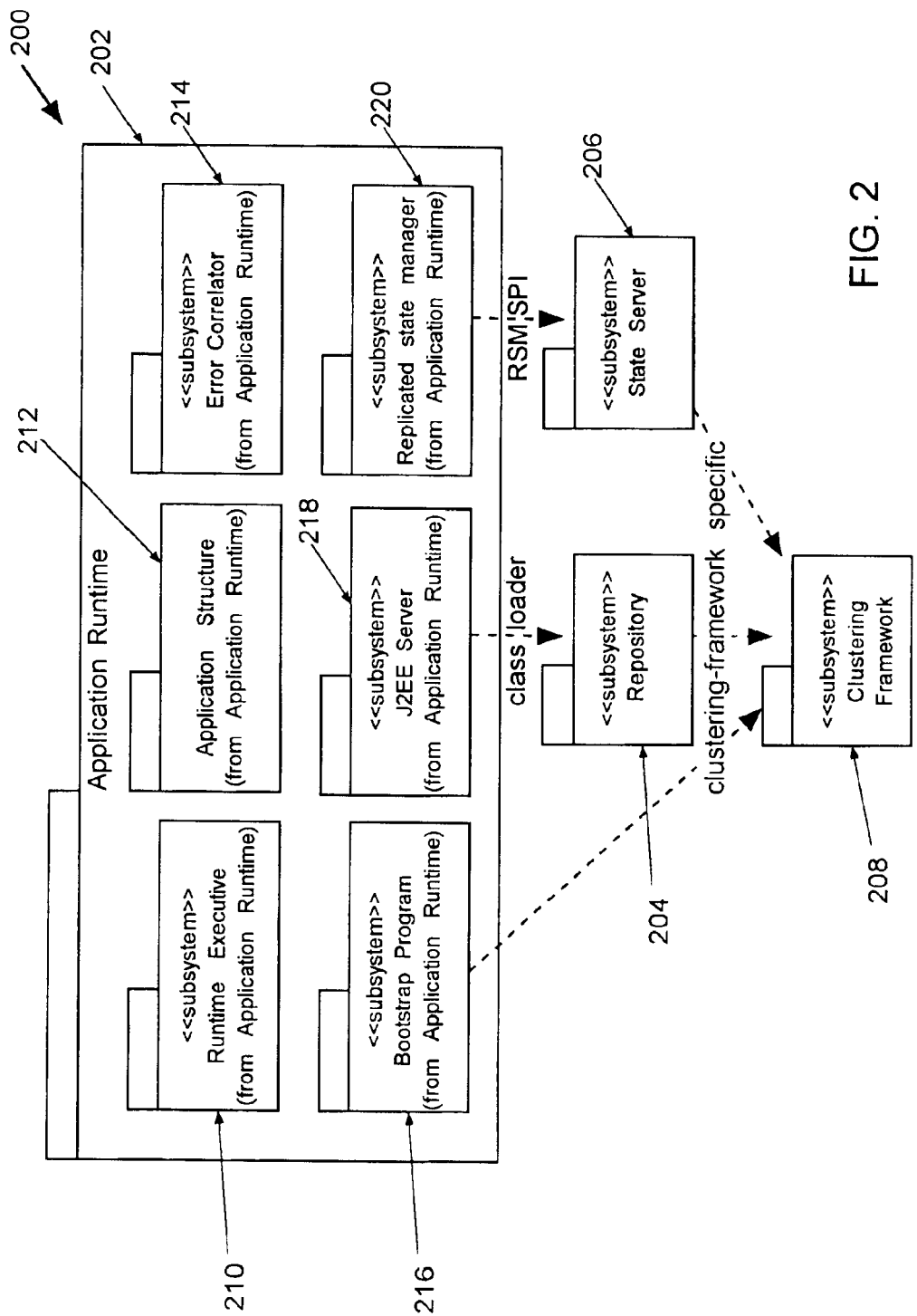
FIG. 2 is a logical diagram of a distributed Java system, in accordance with an embodiment of the present invention.

FIG. 2 is a logical diagram of a distributed Java system 200, in accordance with an embodiment of the present invention. The Java system 200 includes an application run time subsystem 202, a repository subsystem 204, a state server subsystem 206, and a clustering framework subsystem 208. The distributed Java system 200 supports development of carrier-grade Java applications, and further supports online application upgrades, failure recovery, and load balancing across multiple nodes of a clustered system. Moreover, as will be discussed in greater detail subsequently, applications can supply complex policies for the mechanisms implemented by the Java system 200. Advantageously, applications executing on the Java system 200 can, in some embodiments, achieve continuous availability, on the order of about 99.9999% uptime or better.

As mentioned above, the Java system 200 includes an application run time subsystem 202, a repository subsystem 204, a state server subsystem 206, and a clustering framework subsystem 208. The repository subsystem 204 is responsible for maintaining class files of applications installed on the system, the class files of the artifacts generated during application deployment, and the class files of the application run time subsystem 202. The repository depends on the clustering framework subsystem 208 to achieve high availability. The state server subsystem 206 is responsible for storing applications state information and for making the stored state information highly available to the rest of the system. The clustering framework subsystem 208 represents the underlying high availability cluster framework. Thus, the clustering framework subsystem 208 is the foundation on which the Java system 200 is built.

The application runtime subsystem 202 is responsible for the runtime management and supervision of the Java applications executing on the Java system 200. The application runtime subsystem includes a runtime executive subsystem 210, an application structure 212, an error correlator subsystem 214, a bootstrap subsystem 216, a Java server subsystem 218, and a replicated state manager 220. The runtime executive subsystem 210 is responsible for maintaining the state of the runtime, and coordinates the collaborations among the objects that implement the use cases. The error correlator subsystem 214 processes errors reported from other application runtime components, and further determines which parts of the system are faulty. The bootstrap subsystem 216 is used in bootstrapping the application runtime subsystem 200, and uses the facilities of the clustering framework 208 for this purpose. The Java server subsystem 218 implements the Java containers and other APIs required by the Java platform specification, thus providing the runtime environment for Java applications. The replicated state manager (RSM) 220 implements the management of the recoverable state of Java applications within the Java server 218. The RSM 220 uses the state server 206 to achieve recoverability and availability of an application's state.

Figure 3A:
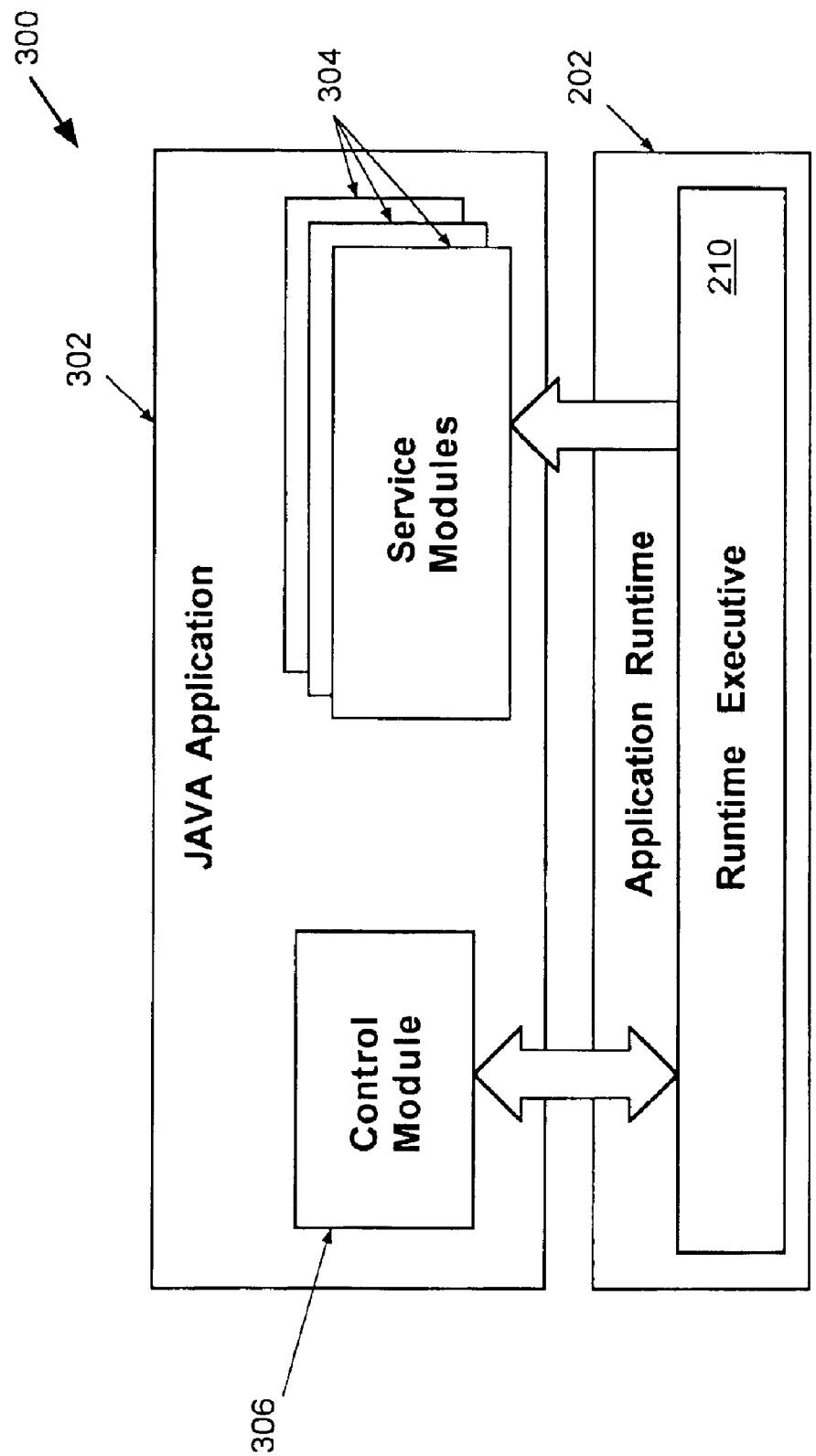
FIG. 3A is a logical diagram showing a Java application execution paradigm, in accordance with an embodiment of the present invention.

FIG. 3A is a logical diagram showing a Java application execution paradigm 300, in accordance with an embodiment of the present invention. The Java application execution paradigm 300 shows a Java application 302 executing in a container under the runtime management and supervision of the application runtime subsystem 202. As mentioned above, the application runtime subsystem 202 includes the runtime executive subsystem 210, which maintains the state of the runtime and coordinates the collaborations among the objects that implement the use cases.

The Java application 302 includes service modules 304 and a control module 306. The service modules 304 are program modules that include the actual code for the application 302, and are generally written as Enterprise JavaBeans, Servlets, or Java Server Pages. The Enterprise JavaBeans (EJBs), Servlets, and Java Server Page implement the actual service logic of the application. The service modules 304 are managed by the runtime executive 210, which determines when and where to execute the service modules 304.

Collaborating with the runtime executive subsystem 210 is the control module 306, which is a code module that includes application-specific policies for the Java application 302. The application-specific policies included in the control module 306 can include policies for application start, application stop, application upgrade, application load balancing, and application failure recovery. To perform these policies, the control module 306 supervises the life cycle of the service modules 304 of the application 302, child applications, and the Java servers by collaborating with the runtime executive subsystem 210. As discussed in greater detail next with reference to FIG. 3B, the application 302 can provide the control module 306, or the application 306 can use a generic control module 306, which the JAVA platform provides.

Figure 3B:
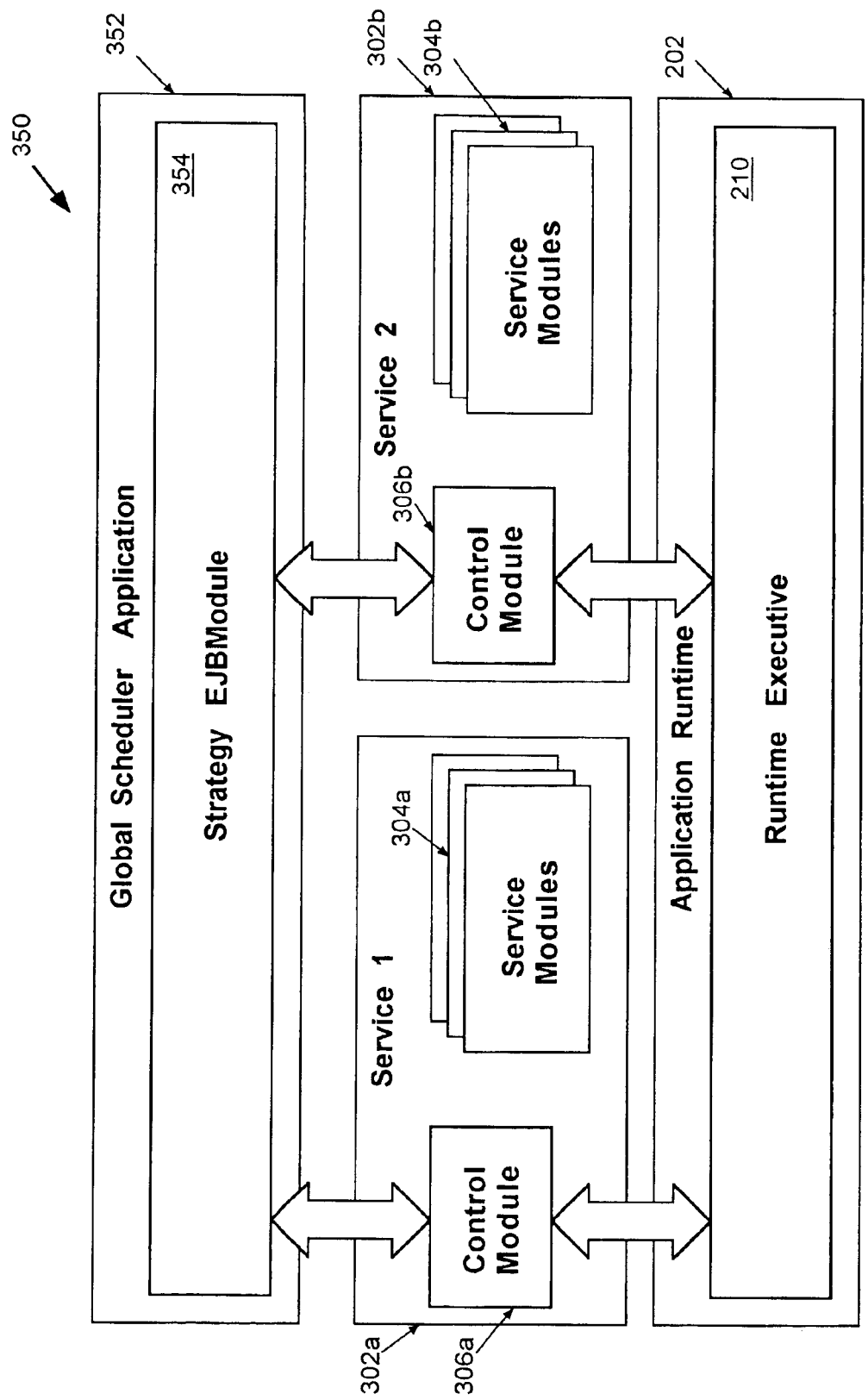
FIG. 3B is a logical diagram showing a Java application execution paradigm wherein generic control modules are injected into Java applications, in accordance with an embodiment of the present invention.

FIG. 3B is a logical diagram showing a Java application execution paradigm 350 wherein generic control modules are injected into Java applications, in accordance with an embodiment of the present invention. FIG. 3B shows two Java applications 302a and 302b executing in a container under the runtime management and supervision of the application runtime subsystem 202. As mentioned above, the application runtime subsystem 202 includes the runtime executive subsystem 210, which maintains the state of the runtime and coordinates the collaborations among the objects that implement the system.

FIG. 3B further shows a global scheduler application 352 having a strategy Enterprise JavaBeans module 354. Here, the application runtime subsystem 202 includes generic implementations of control modules 306a and 306b that are used for applications 302a and 302b, which do not provide custom control modules of their own. The global scheduler application 352 and strategy Enterprise JavaBeans module 354 provide the global scheduling and the application strategies and policies for both Java applications 302a and 302b. In particular, the global scheduler application 352 and strategy Enterprise JavaBeans module 354 ensure the control modules 306a and 306b cooperate such that they do not interfere with each other, for example by executing each application 302a and 302b on a separate node. Thus, the embodiments of the present invention are able to provide platform independent application-specific policies and strategies for both applications having custom policies designed by the developer, and for applications that do not have custom policies.

Figure 4:
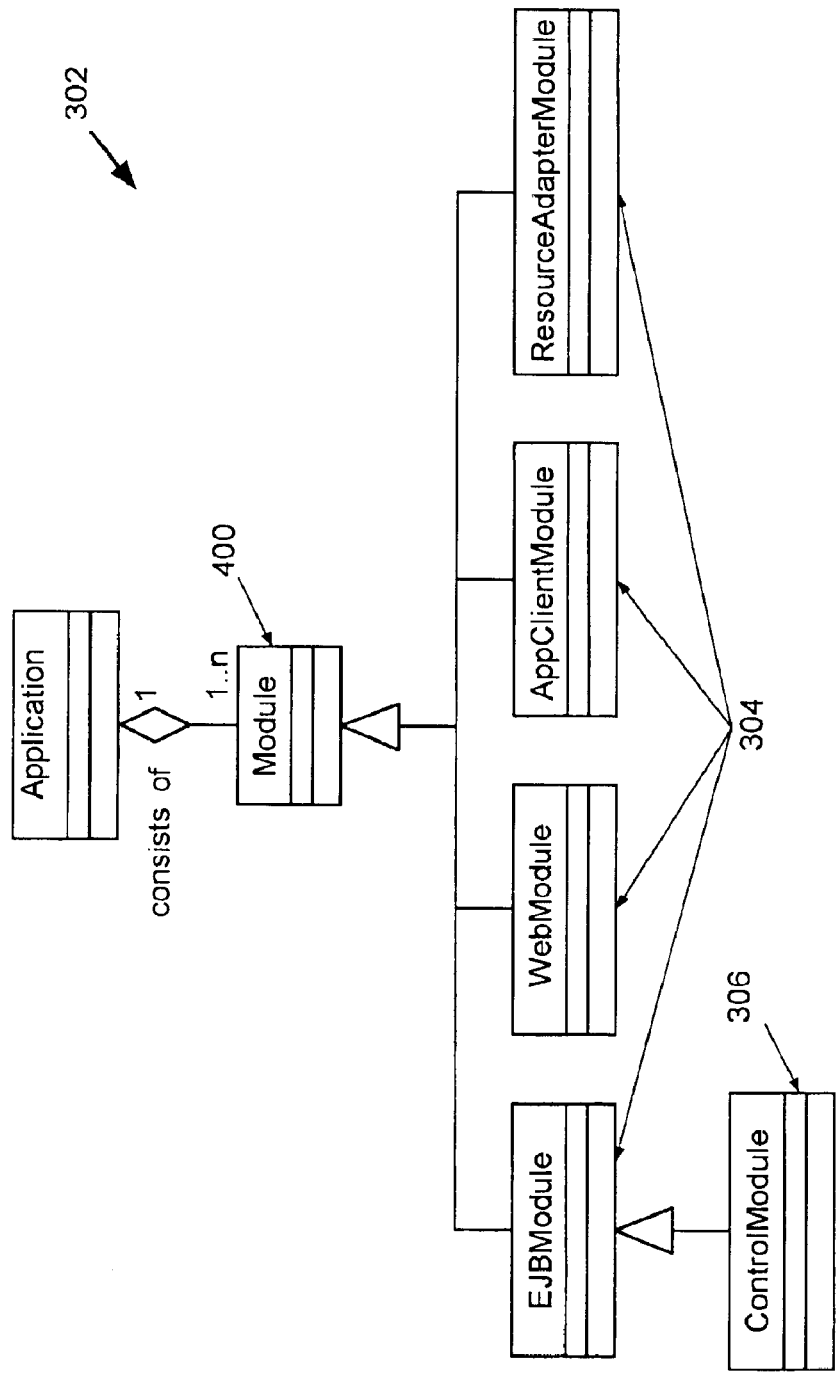
FIG. 4 is structural diagram of a Java application, in accordance with an embodiment of the present invention.

FIG. 4 is structural diagram of a Java application 302, in accordance with an embodiment of the present invention. As shown in FIG. 4, a Java application 302 comprises one or modules 400, which provide the functionality for the application 302. Each module 400 can be any one of several service module 304 types, such as an Enterprise JavaBean module, a Web module, an Application Client module, or a Resource Adapter module. In addition, a module 400 of an application 302 can be a control module 306, which is a particular type of Enterprise JavaBean module.

In addition to performing the operations discussed previously, the control module 306 can communicate with the control modules 306 of other applications using EJB invocations or other communication API supported by the Java platform. By communicating with each other, the control modules 306 of related applications can coordinate the policies for multiple applications (e.g. perform load-balancing of multiple applications). In addition, the control module 306 can communicate with the application's 302 service modules 304 using EJB invocations or other communication API supported by the Java platform. By communicating with the service modules, the control modules can affect the functions of the service modules. Moreover, the control module 306 can communicate with external applications. An external application can thereby affect the supervision of application's modules. Further the control module 306 can use its recoverable EJB CMP state, because a Control Module 306 is an EJB Module, which the system manages in a highly available manner.

Figure 5:
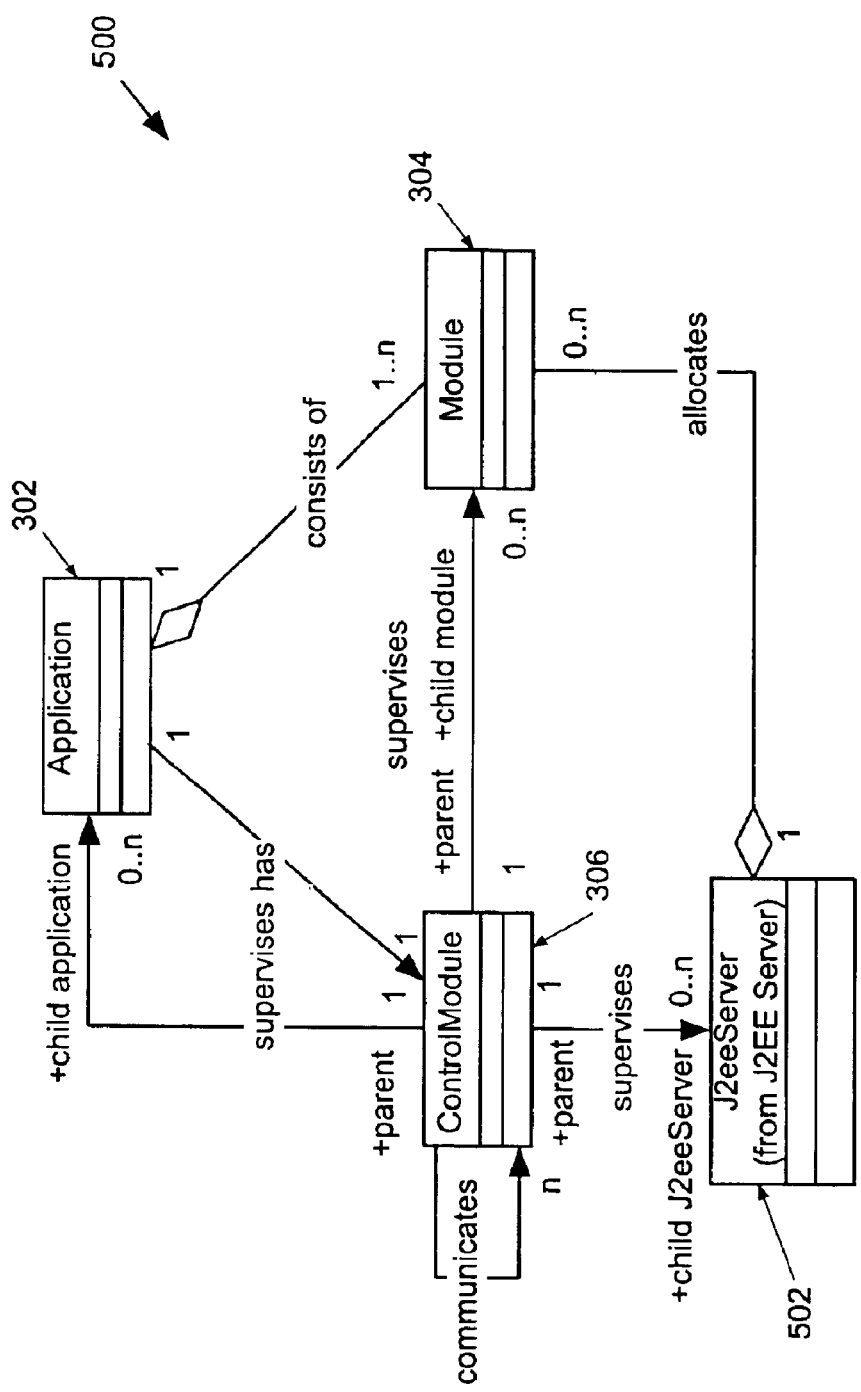
FIG. 5 is a logical diagram showing an application-server relationship, in accordance with an embodiment of the present invention.

FIG. 5 is a logical diagram showing an application-server relationship 500, in accordance with an embodiment of the present invention. As shown in FIG. 5, an application 302 includes a control module 306 and one or more service modules 304, which are each allocated to a server process 502. In operation, each module has a parent module that supervises the module, including starting, stopping, and supervising upgrades of the module. In the embodiments of the present invention, the control module 306 is the parent module of the service modules 304 of the application 302.

Thus, the control module 306 starts each service module 304 and allocates the service module to a server process 502. In addition, a control module 306 can start a child application 302 by starting a control module 306 for that child application 302.

Figure 6:
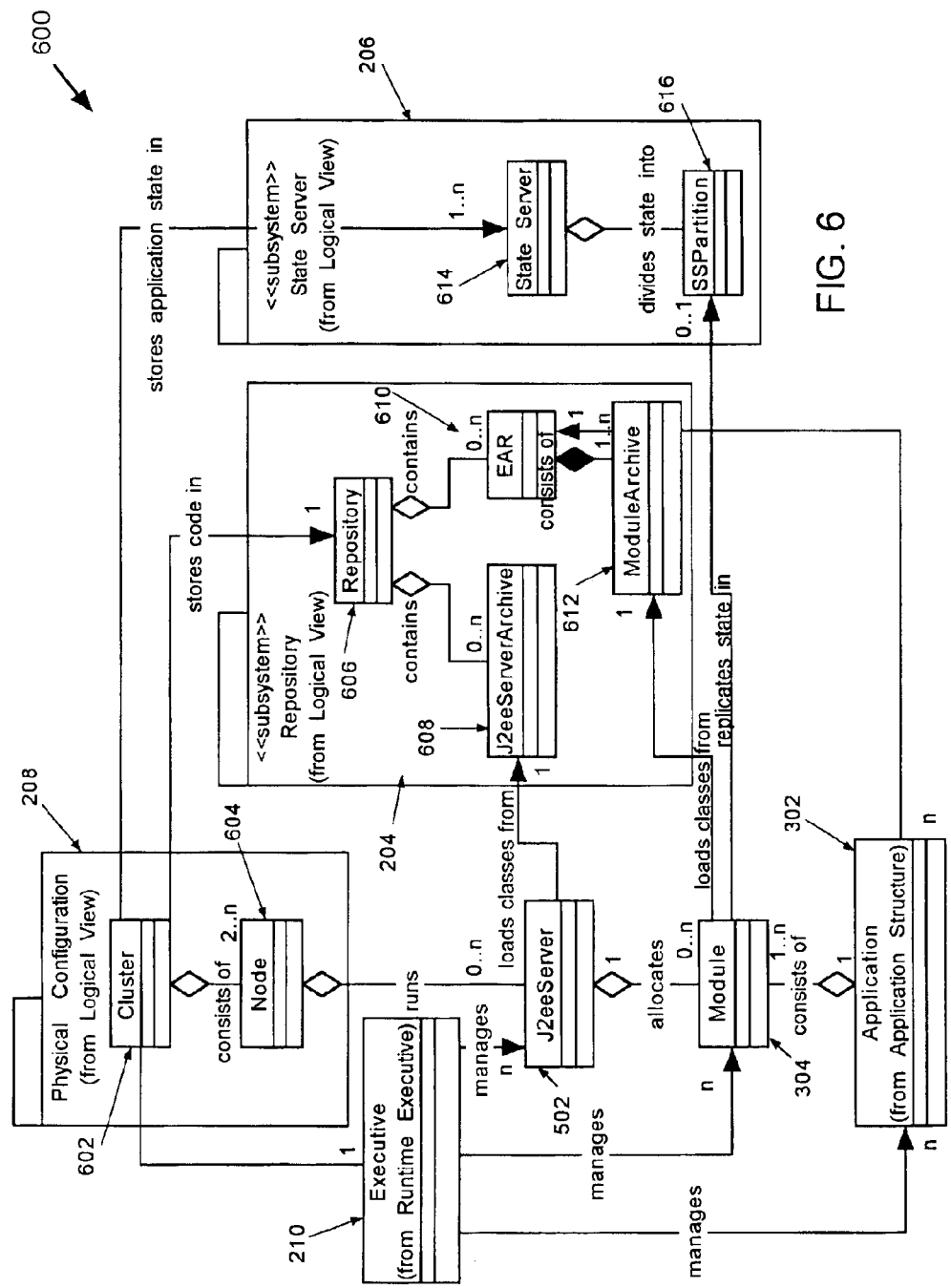
FIG. 6 is an architectural diagram showing class structure for a Java system, in accordance with an embodiment of the present invention.

FIG. 6 is an architectural diagram showing class structure for a Java system 600, in accordance with an embodiment of the present invention. The Java system 600 includes an application runtime having four main classes: Executive 210, J2EE Server 502, Application 302, and Module 304. Objects from these classes execute over a physical configuration 208 of a cluster 602 comprising several nodes 604 to form a distributed computer system. Typically, the Java system 600 has one Executive object 210, and each node 604 in the cluster 602 runs zero or more J2EE Servers 502, which can be a UNIX process running a Java virtual machine (JVM) with the J2EE runtime classes. However, it should be noted that other As shown in FIG. 6, each application object 302 comprises of one or more modules 304, which generally are the smallest unit for the purposes of runtime supervision in the Java system 600. Bach Module 304 preferably is allocated to a single J2EE server 502, however a J2EE server 502 can allocate multiple modules 304.

The executive 210 manages the application 302, module 304, and J2EE server 502 objects. The management includes the orchestration of the use cases, such as start, stop, and upgrade of the Java system 600 and applications, handling failures of the application 302, module 304, and J2EE server 502 objects. The executive 210 also performs load balancing across the J2EE servers 502 and nodes 604 in the cluster 602. In operation, the class files of an application's modules 304 are loaded from a single EAR 610 file in the repository 204. In particular, the class files of each module 304 arc loaded from a single module archive 612.

In addition, a module 304 may have a recoverable state managed by the Replicate State Manager (RSM), which is integrated into the J2EE server 502. The recoverable state includes the state of EJB CMP enterprise beans and the persistent message sent by the bean but not processed yet by the recipients. If a module 304 has a recoverable state, the recoverable state is replicated in a SSPartition object 616 in the state server 614.

The class files of a J2EE server 502 are loaded from a J2EE server archive 608 in the repository 204. In general, the system 600 includes a single repository 204 and one or more state servers 614, however, other embodiments can include multiple repositories 204 depending on the particular system requirements. Multiple state servers 614 are used to provide support for different state management policies, and to achieve performance scalability by running multiple state server 614 instances.

Figure 7:
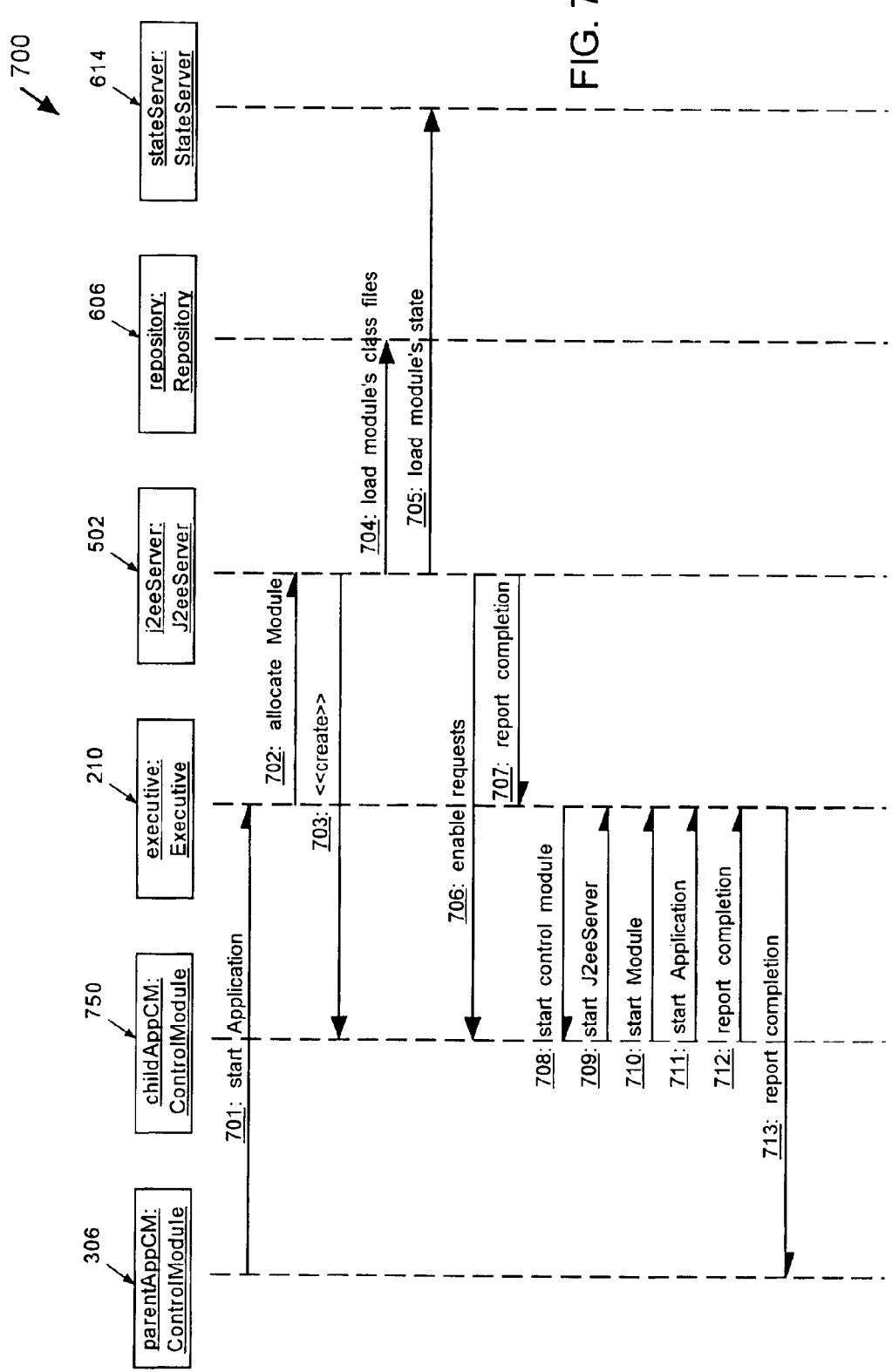
FIG. 7 is a sequence diagram showing an application start sequence, in accordance with an embodiment of the present invention.

As previously mentioned, the control module 306 of the embodiments of the present invention can be used to manage other aspects of an application, including starting, stopping, and load balancing multiple child applications and modules. FIG. 7 is a sequence diagram showing an application start sequence 700, in accordance with an embodiment of the present invention. The application start sequence 700 shows the interaction between a parent application control module 306, a child application control module 750, a runtime executive 210, a J2EE Server 502, a repository 606, and a state server 614.

The application start sequence 700 illustrates how a parent application's control module 306 initiates the start of a child application by creating the child application's control module 750. Broadly speaking, the parent applications control module 306 allocates the child application's control module 750 to a specified J2EE server 502. The child application's control module 750 then coordinates the remainder of the child application's start up.

In operation 701, the parent application's control module 306. requests the executive 210 to start a child application. The request includes the J2EE server 502 in which the executive 210 should allocate the child application's control module 750. The request may also include optional application-specific data to be passed to the child application's control module.

The executive 210 then requests the J2EE server 502 to allocate the child application's control module 750, in operation 702. The J2EE server 502 then creates the child application's control module 750 and allocates the data structures that the J2EE server 502 needs to manage the child control module 750 at runtime, in operation 703. In addition, the J2EE server 502 loads the child application's control module 750 class files from the repository 606 into J2EE Server 502 memory, in operation 704.

In operation 705, the J2EE Server 502 loads the child application's control module 750 recoverable state from the State Server 614 into the J2EE Server 502 memory. The J2EE Server 502 then enables routing of incoming messages to child application's control module 750, in operation 706. After enabling routing of income messages to the child control module 750, other application modules can communicate with child application's control module 750. Then, in operation 707, the J2EE Server 502 reports completion of module allocation to the executive 210.

In operation 708, the executive 210 requests the child application's control module 750 to start the rest of the child application, which includes starting the child application's service modules, J2EE Servers, and child applications. The request can also include the application-specific data passed from parent application's control module 306.

The child application's control module 750 then starts zero or more child J2EE Servers, in operation 709, using the Start J2EE Server sequence, discussed subsequently with respect to FIG. 9. The child application's control module 750 starts zero or more service modules, in operation 710, using the Start Module sequence, discussed below with respect to FIG. 8. It should be noted that the child application's control module 750 may start the same service module multiple times and spread the instances across multiple J2EE Servers 502 and nodes to scale up the service module's throughput. In operation 711, the child application's control module 750 starts zero or more child applications using the Start Application sequence 700. The child application's control module 750 then reports completion to the executive 210, in operation 712. The completion message may include optional application-specific data that child application's control module 750 wants to pass to parent application's control module 306. The executive 210 then reports completion to parent application's control module 306. This completion message preferably includes the application-specific data passed from child application's control module 750 in operation 712.

In other embodiments of the present invention, the child application's control module 750 can report completion of "start children" before it starts up its child modules, J2EE Servers, and applications. Thus, operations 712 and 713 can occur before operations 709, 710, and 711, or concurrently with them. In addition, the child application's control module 750 can perform operations 709, 710, and 711 in any order, and can perform them concurrently. Further, in operation 705, the child application's control module 750 may load only a part of its recoverable state from the State Server 614. The remaining parts can then be loaded when the child application's control module 750 needs them for computation.

Figure 8:
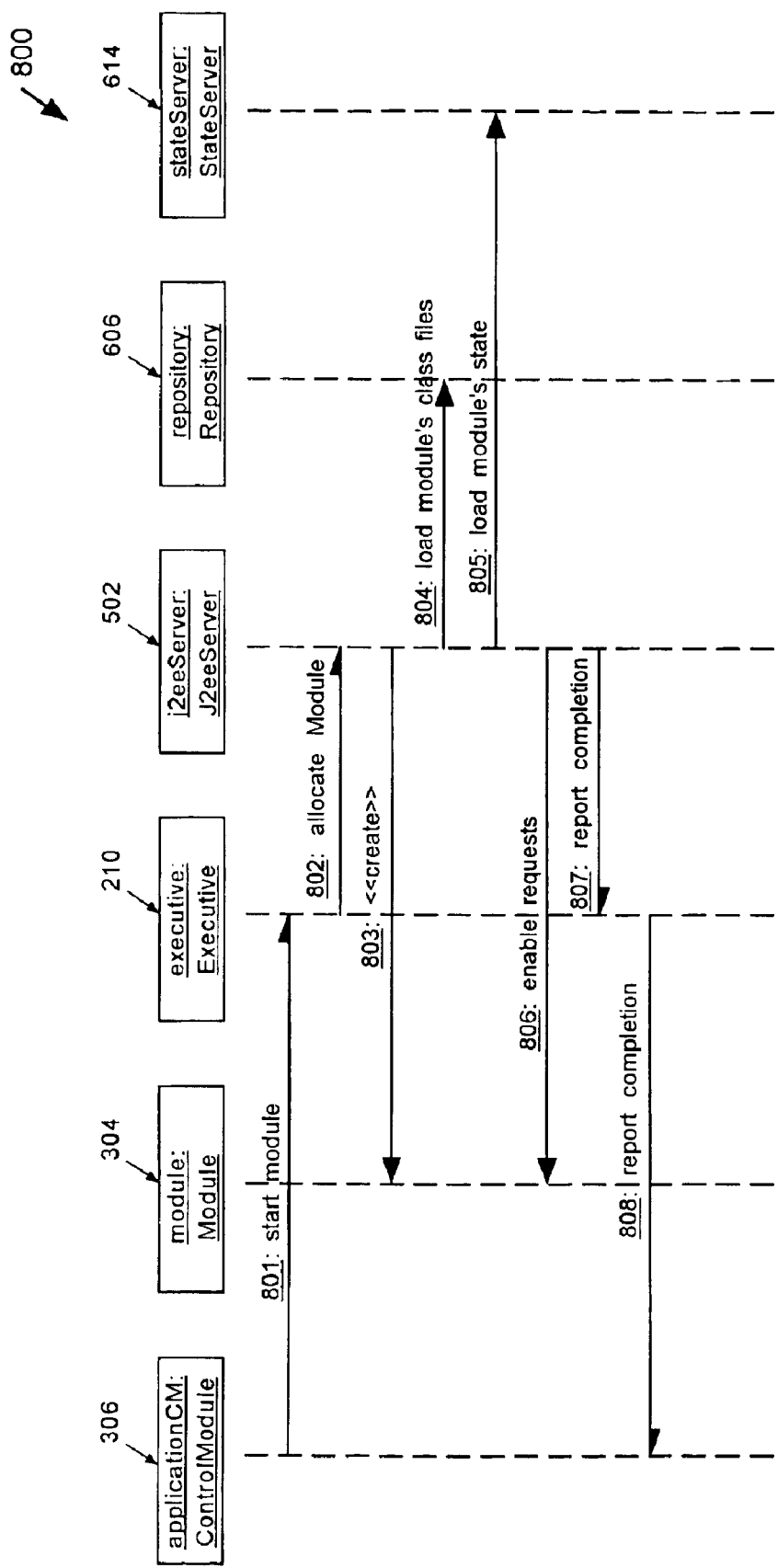
FIG. 8 is a sequence diagram showing a module start sequence, in accordance with an embodiment of the present invention.

FIG. 8 is a sequence diagram showing a module start sequence 800, in accordance with an embodiment of the present invention. The module start sequence 800 shows the interaction between a control module 306, a service module 304, a runtime executive 210, a J2EE Server 502, a repository 606, and a state server 614. In particular, the module start sequence 800 illustrates how an application's control module 306 starts a service module 304 and allocates the service module 304 to a specified J2EE server 502.

In operation 801, the application's control module 306 requests the executive 210 to start a module 304. Preferably, the request specifies a particular J2EE Server 502 in which the module 304 should be allocated. The executive 210 then requests J2EE Server 502 to allocate the module 304, in operation 802.

In operation, 803, the J2EE Server 502 creates the module 304 and allocates the data structures that the J2EE server 502 needs to manage the module 304 at runtime, and loads the module's class files from repository 606 into its memory in operation 804. In operation 805, J2EE Server 502 loads the module's recoverable state from State Server 614 into the J2EE Server memory, and enables routing of incoming messages to the module 304, in operation 806. After enabling the routing of incoming messages to the module 304, other application modules and external applications can communicate with the module. The J2EE Server 502 then reports completion of module allocation to the executive 210 in operation 807, and the executive 210 reports completion to control module 306. in operation 808.

Figure 9:
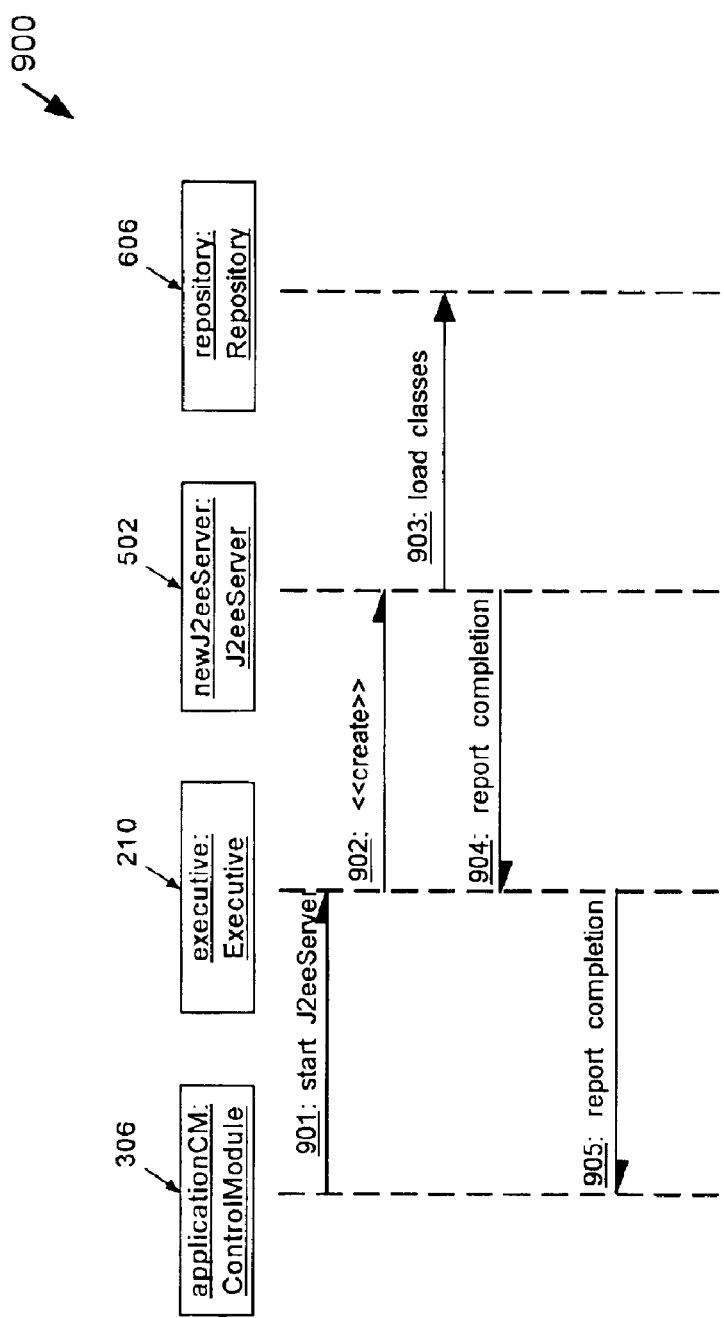
FIG. 9 is a sequence diagram showing a J2EE server start sequence, in accordance with an embodiment of the present invention.

FIG. 9 is a sequence diagram showing a J2EE server start sequence 900, in accordance with an embodiment of the present invention. The J2EE server start sequence 900 shows the interaction between a control module 306, a runtime executive 210, a J2EE Server 502, and a repository 606. In particular, the J2EE server start sequence 900 illustrates how an application's control module 306 starts a new J2EE server process 502 on a specified node.

In operation 901, the control module 306 requests the executive 210 to start a J2EE Server 502. Generally, the request specifies the node on which to start the J2EE Server 502, and the version of the J2EE Server 502. Then, in operation 902, the executive 210 creates the new J2EE Server 502 on the specified node and requests the J2EE server 502 to initialize itself. In response, the J2EE server 502 loads its class files from the J2EE Server Archive in the Repository 606, in operation 903. The J2EE server 502 then reports completion of its initialization to the executive 210, in operation 904, and the executive reports completion to control module, in operation 905. Since the creation of a new J2EE Server 502 can be CPU intensive, the implementation preferably ensures that the creation of a new J2EE Server 502 is performed at a lower priority than the processing of normal application-level requests by existing J2EE Servers on the same node.

Figure 10A:
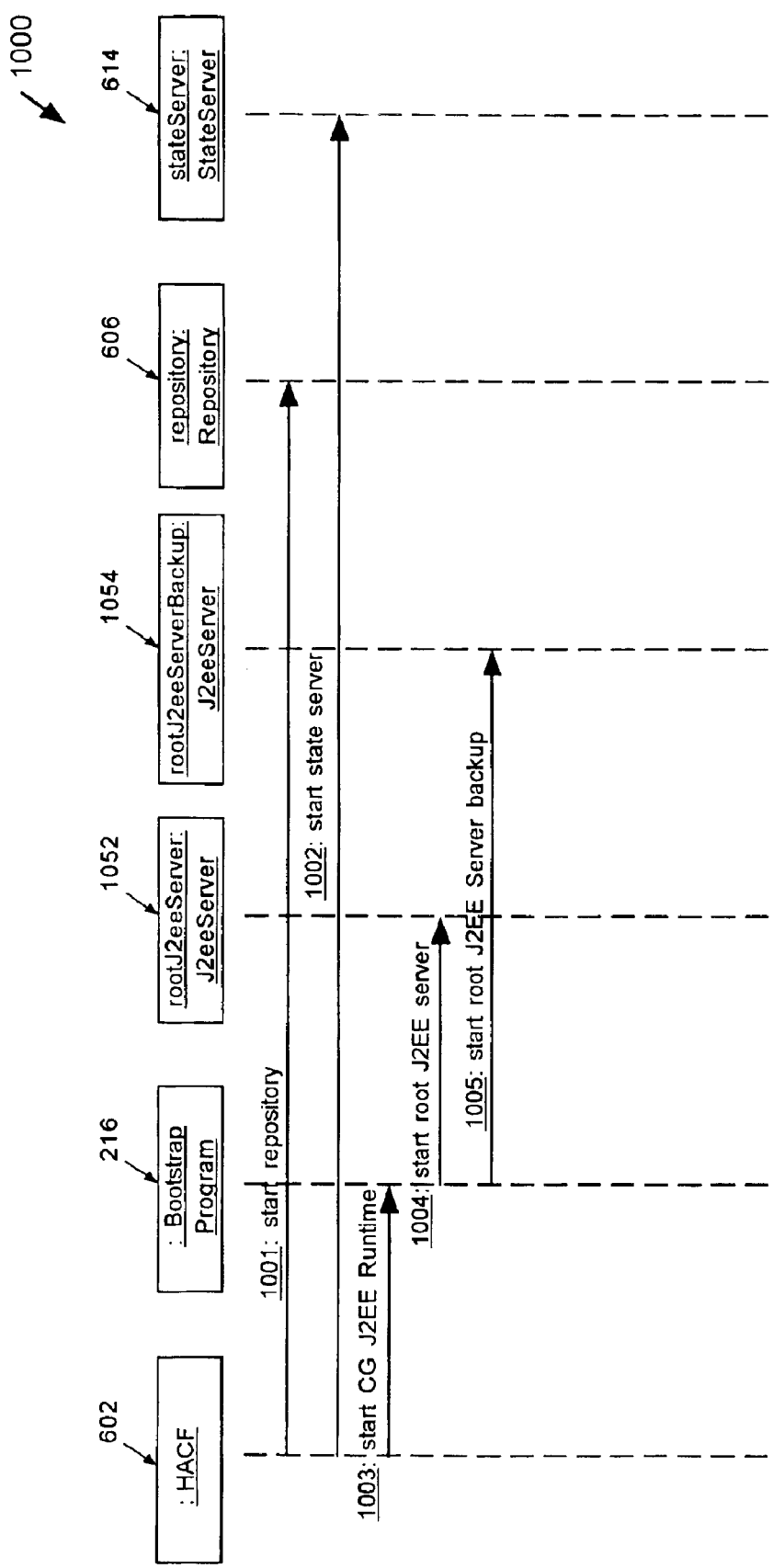
FIGS. 10A and 10B are sequence diagrams showing a J2EE system start sequence, in accordance with an embodiment of the present invention.
Figure 10B:
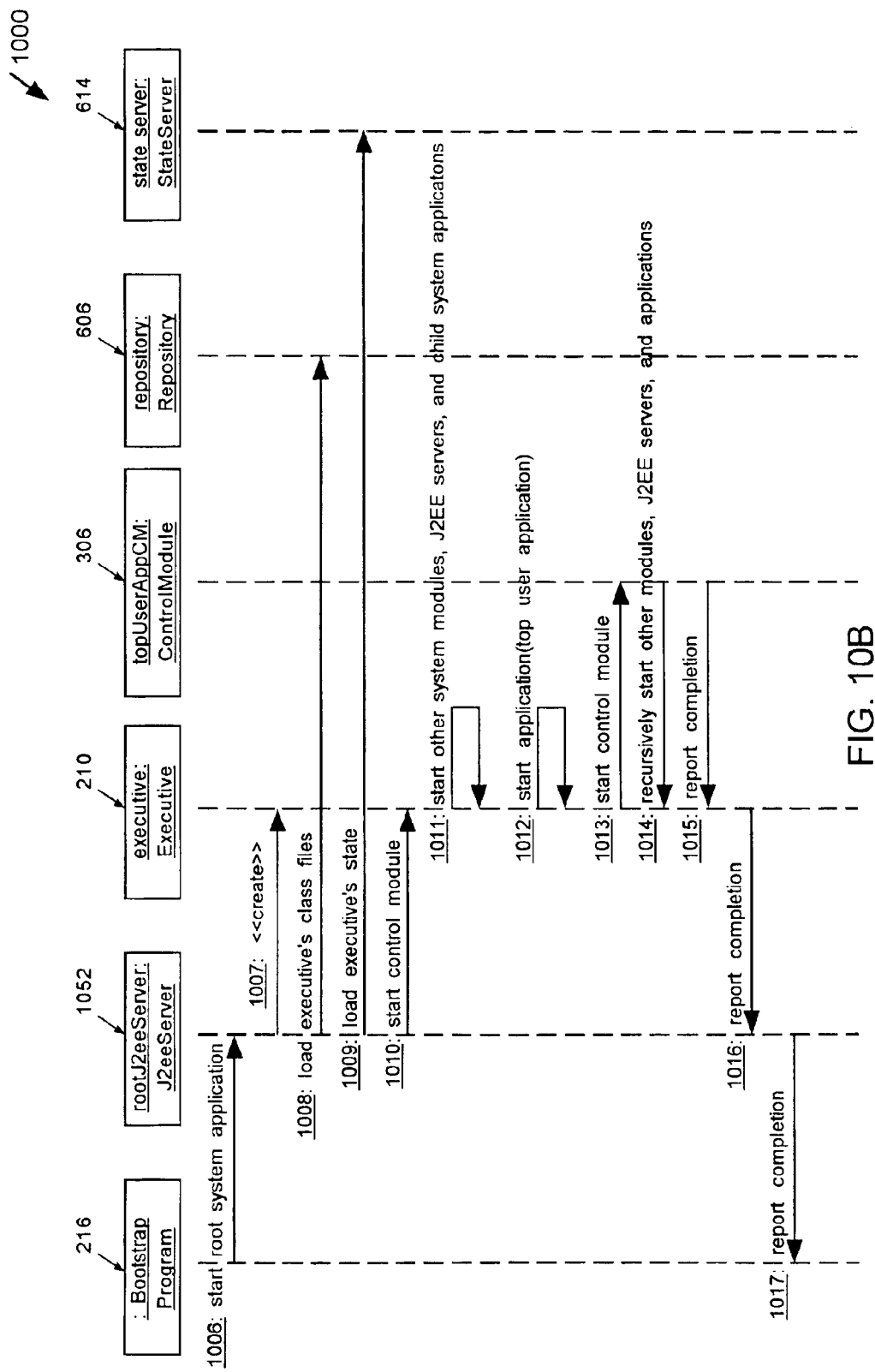

FIGS. 10A and 10B are sequence diagrams showing a J2EE system start sequence 1000, in accordance with an embodiment of the present invention. The J2EE system start sequence 1000 illustrates the start up sequence of the J2EE system. Broadly speaking, an underlying Clustering Framework 602 starts a bootstrap program 216, which then creates the root J2EE server process 1052 on one node and a backup server process 1054 on another node. The bootstrap program 216 then requests the root J2EE Server 1052 to create a root system application by creating its control module 306. The executive 210 then starts other system modules and applications. Then, the executive 210 starts a Top User Application, which recursively starts up other user applications.

Initially, in operation 1001, the underlying Clustering Framework 602 starts the repository 606. In one embodiment, the repository 606 is implemented as a high availability service within the Clustering Framework 602. In operation 1002, the Clustering Framework 602 starts the state server 614, and, if there are multiple state servers 614, all state servers 614 are started. As with the repository, in some embodiments of the present invention, the state server 614 is implemented as a high availability service within the Clustering Framework 602. Then, in operation 1003, the Clustering Framework 602 starts an instance of the bootstrap program 216.

In operation 1004, the bootstrap program 216 starts a root J2EE Server 1052 process using an extension of the J2EE Server start sequence 900. In addition, in operation 1005, the bootstrap program 216 uses an extension of the J2EE Server start sequence 900 to start a root J2EE Server Backup 1054 process. Then, in operation 1006, the bootstrap program 216 requests root J2EE Server 1052 to start the root system application. The Root J2EE Server 1052 then starts the root system application by allocating the control module, which is the module implementing the executive 210, in operation 1008. After starting the root system application, the Root J2ee Server 1052 loads the executive's class files from the repository 606, in operation 1009, and, in operation 1010, the Root J2EE Server 1052 loads the executive's recoverable state from the state server 614.

In operation 1011, the Root J2EE Server 1052 requests the executive 210 to start the root system application. It should be noted that the executive 210 functions as the control module for the root system application. In response, the executive 210 requests itself to start the root system application's other modules, J2EE servers, and child system applications using the module start sequence 800, J2EE Server start sequence 900, and application start sequence 700, in operation 1011. In this capacity, the executive 210 functions as the parent control module in these start sequences.

The executive 210 also requests itself to start the top user application, in operation 1012, using the application start sequence 700, and acts as the parent control module in this use case. In response, the executive 210 allocates the top user application's control module 306 and requests the control module 306 to the start the top user application, in operation 1013.

In operation 14, the top application's control module 306 starts other modules, J2EE Servers, and child applications. Starting of child applications leads to recursion, which results in starting all J2EE applications. Then, in operation 1015, the top user applications control module 306 reports completion of the start children request to the executive 210. In response, the executive 210 reports completion to the root J2EE server 1052, in operation 1016, and, in operation 1017, the root system application's control module reports completion to the root J2EE server.

Figure 11:
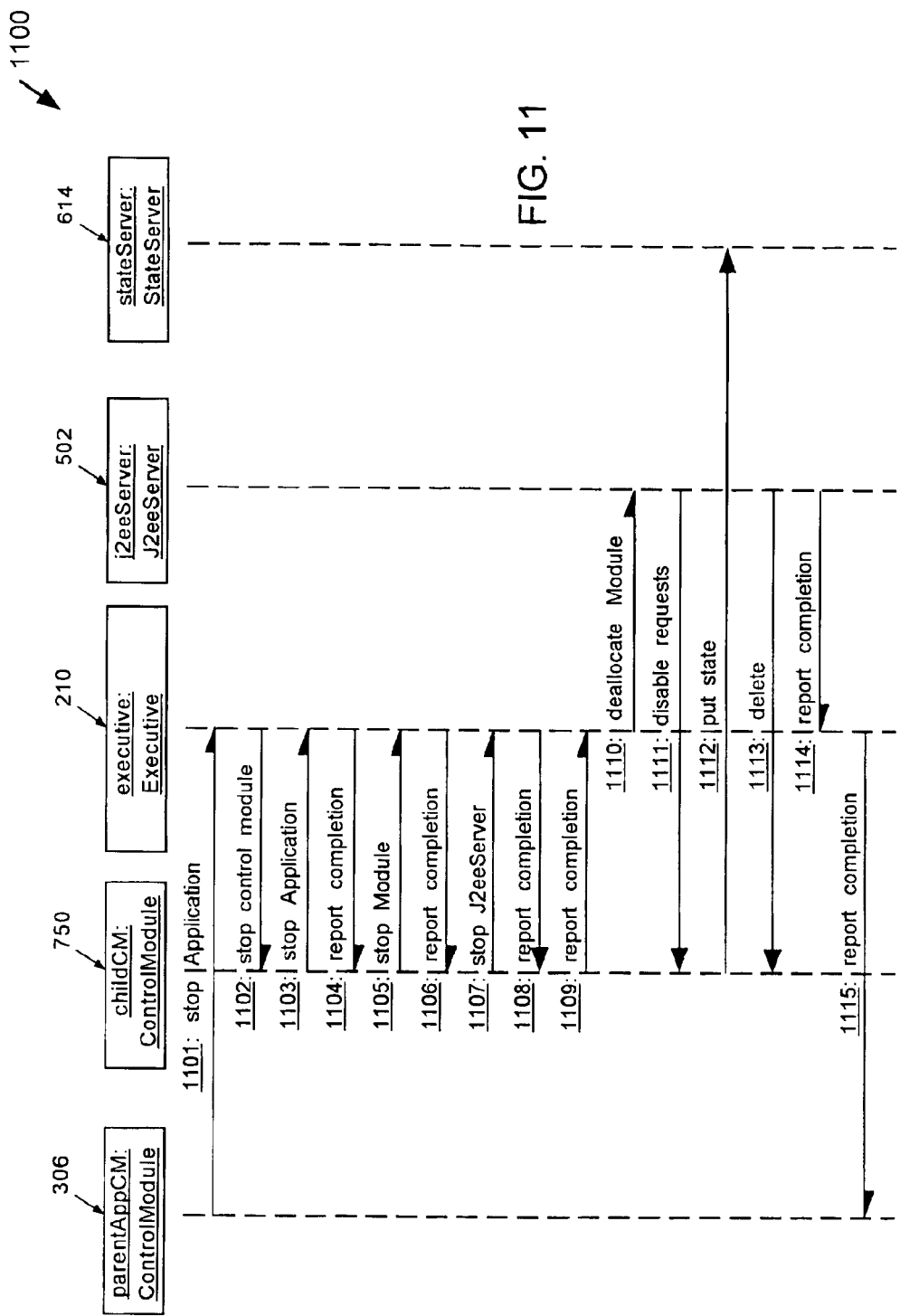
FIG. 11 is a sequencing diagram showing an application stop sequence, in accordance with an embodiment of the present invention.

FIGS. 11–14 illustrate stop sequences used by control modules of the embodiments of the present invention. In particular, FIG. 11 is a sequencing diagram showing an application stop sequence 1100, in accordance with an embodiment of the present invention. The application stop sequence 1100 illustrates how a parent applications control module 306. stops a child application by requesting to stop the child applications control module 750. The child application's control module 750 stops the application's service modules 304 and child applications.

In operation 1101, the parent application's control module 306 requests the executive 210 to stop a child application. In response to the request, the executive 210 sends a stop control module request to the child application's control module 750, in operation 1102. Next, in operation 1103, the child application's control module 750 requests the executive 210 to stop its child application. The child application's control module 750 repeats this step for all its child applications by recursively applying the application stop sequence 100. When the child applications of the child application's control module 750 are stopped, the executive reports completion of the request, in operation 1104.

The child application's control module 750 then requests the executive to stop a service module, in operation 1105. The child application's control module 750 repeats this request for all the application's service modules, using the module stop sequence 1200 discussed subsequently with reference to FIG. 12. When the executive 210 completes the requests. in operation 1106, the executive 210 reports completion of the requests initiated in operation 1105. The child application's control module 750 then, in operation 1107, requests the executive 210 to stop a J2EE Server 502, and repeats this operation for all its child J2EE Servers 502 using the J2EE Server stop sequence 1300 discussed below with reference to FIG. 13. The executive reports completion of the stop J2EE server requests in operation 1108. In response, the child application's control module 750 reports the completion of the stop control module request to the executive 210.

Next, in operation 1110, the executive 210 requests the J2EE Server 502 running the child application's control module 750 to deallocate the child application's control module 750. In response, the J2EE Server 502 disables child application's control module 750 from receiving new requests, in operation 1111. In addition, the J2EE Server 502 writes any unsaved recoverable state of child application's control module 750 to the state server 614, in operation 1112. Then, in operation 1113, the J2EE Server deletes child application's control module 750. Once the control module 750 is deleted, the J2EE Server 502 reports completion to the executive 210, in operation 1114, and the executive 210 reports completion to the parent application's control module 306, in operation 1115.

Figure 12:
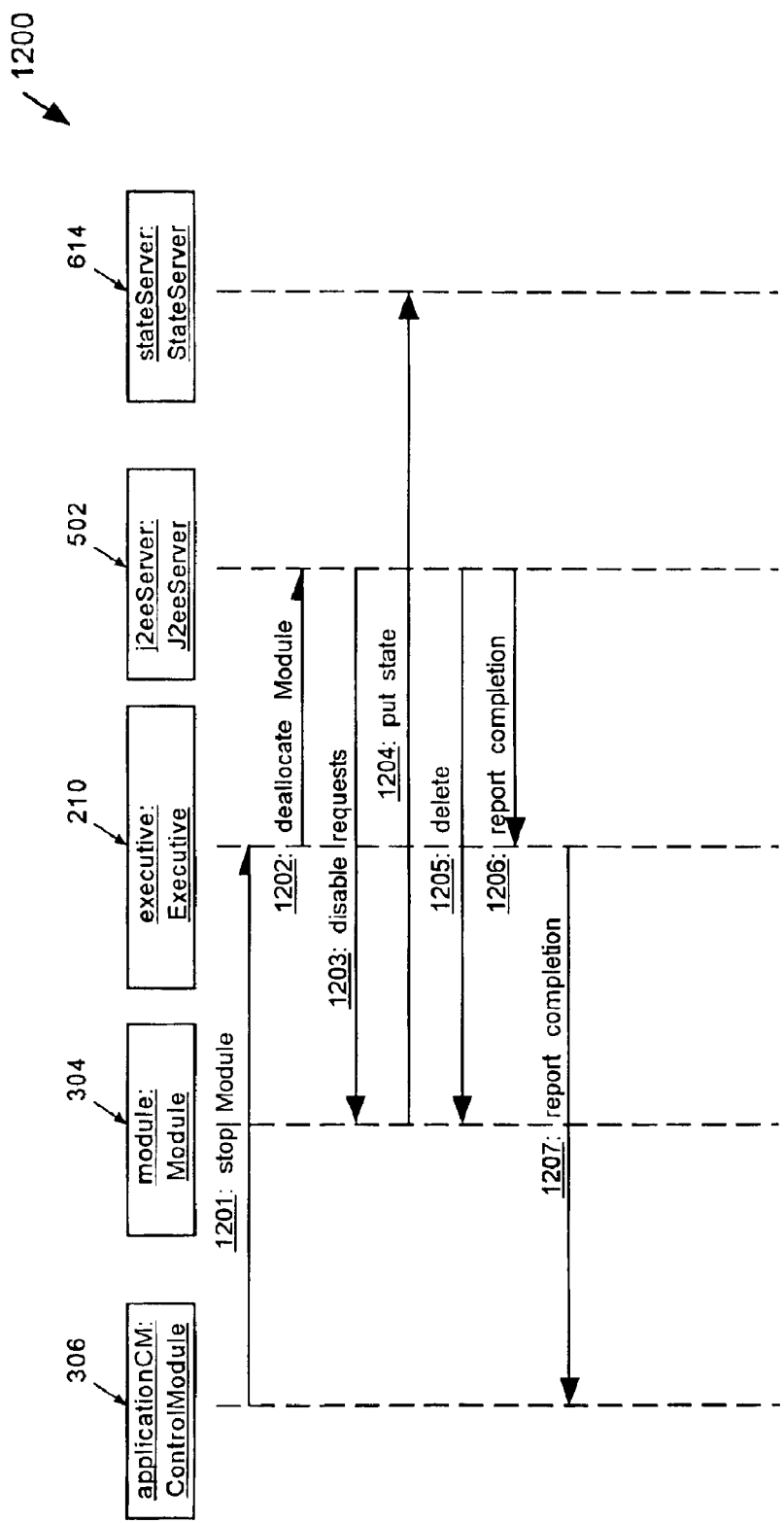
FIG. 12 is a sequencing diagram showing a module stop sequence, in accordance with an embodiment of the present invention.

FIG. 12 is a sequencing diagram showing a module stop sequence 1200, in accordance with an embodiment of the present invention. The module stop sequence 1200 illustrates how an application's control module 306 stops a service module 304. Initially, in operation 1201, the control module 306 requests the executive 210 to stop a service module 304. In response, the executive 210 requests the J2EE Server 502 running the module 304 to deallocate the module 304, in operation 1202.

The J2EE Server 502 then disables the module 304 from receiving new requests, in operation 1203, and writes any unsaved recoverable state of the module to the state server 614, in operation 1204. The J2EE Server 502 then deletes the module from its memory, in operation 1205. In operation 1206, the J2EE Server reports completion to the executive 210, and then the executive reports completion to the control module 306, in operation 1207.

Figure 13:
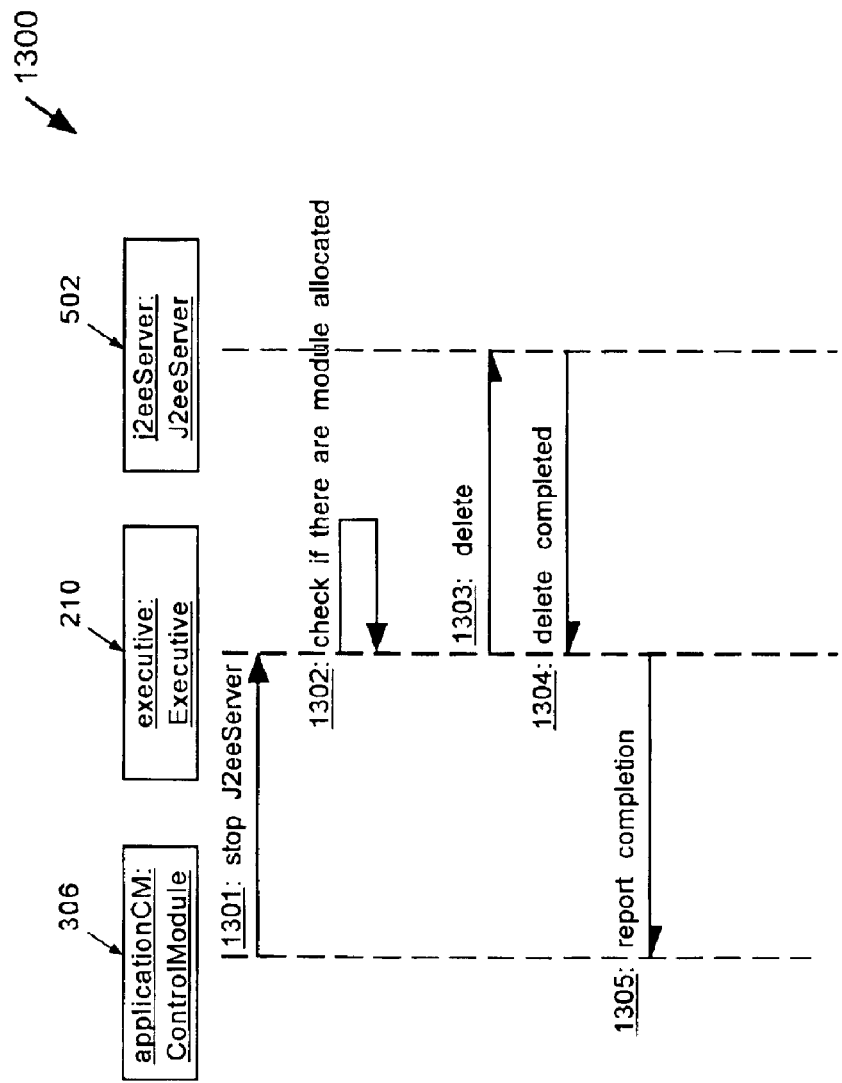
FIG. 13 is a sequencing diagram showing a J2EE server stop sequence, in accordance with an embodiment of the present invention.

FIG. 13 is a sequencing diagram showing a J2EE server stop sequence 1300, in accordance with an embodiment of the present invention. The J2EE server stop sequence 1300 illustrates how an application's control module 306 stops a J2EE server process 502. Initially, in operation 1301, the control module 306 that started J2EE Server 502 requests the executive 210 to stop J2EE Server 502. Then, in operation 1302, the executive 210 checks whether there are any modules allocated to the J2EE Server 502. If there are any modules allocated to J2EE Server 502, the executive 210 reports an error to the control module 306.

If there are no modules allocated to the J2EE Server 502, the executive 210 requests J2EE Server 502 to delete itself by freeing all resources and exiting, in operation 1303. The completion of the delete request is then reported to the executive 210, in operation 1304, and the executive 210 reports completion to the control module 306, in operation 1305.

Figure 14:
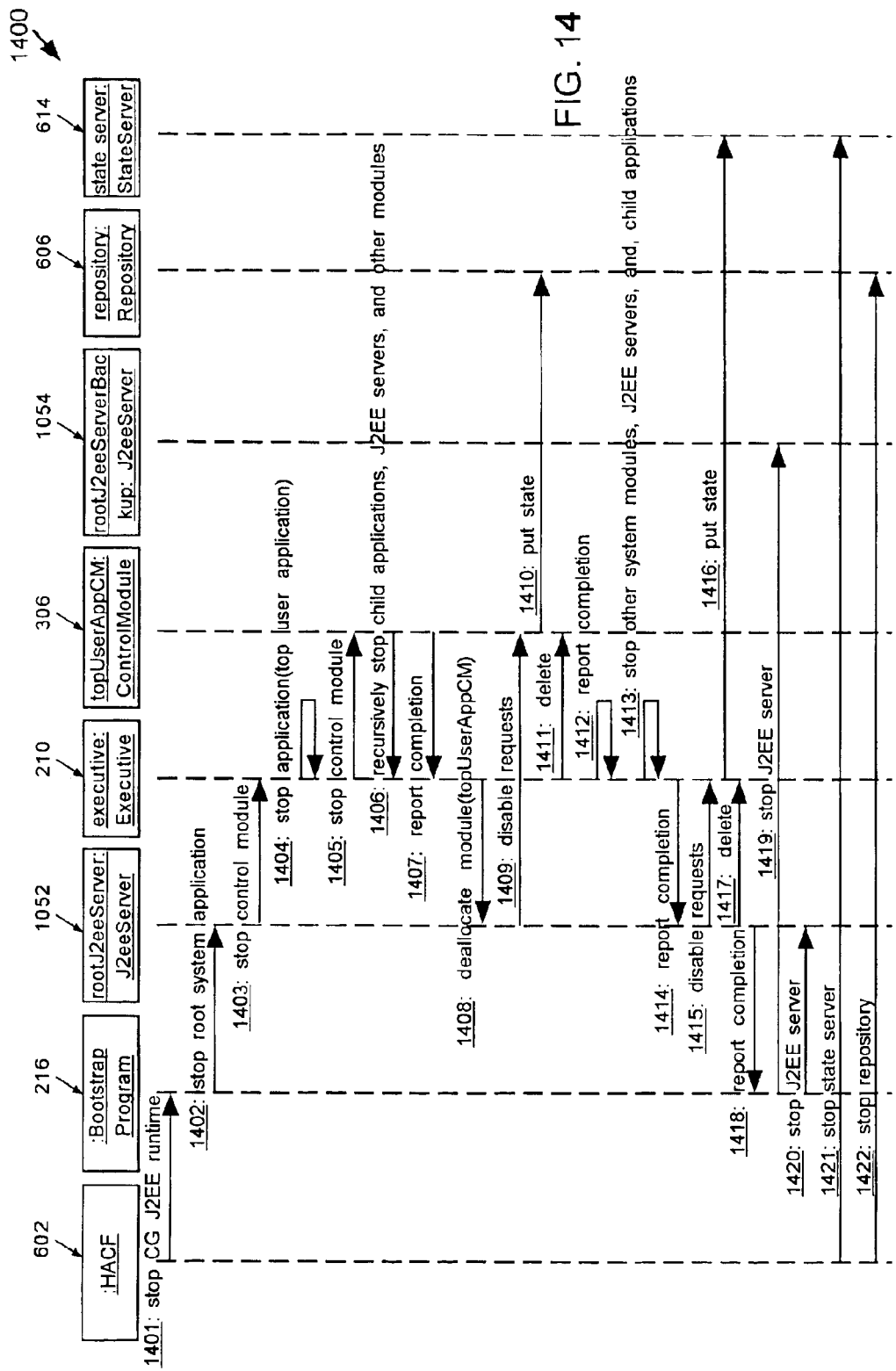
FIG. 14 is a sequencing diagram showing a J2EE system stop sequence, in accordance with an embodiment of the present invention.

FIG. 14 is a sequencing diagram showing a J2EE system stop sequence 1400, in accordance with an embodiment of the present invention. The J2EE system stop sequence 1400 illustrates the shutdown of the J2EE system. Broadly speaking, the underlying Clustering Framework 602 requests the bootstrap program 216 to stop the J2EE system. The bootstrap program 216 stops the Root System Application, which recursively stops all user and system applications. Then the bootstrap program 216 stops the root J2EE server 1052.

Initially, in operation 1401, the underlying Clustering Framework 602 requests the bootstrap program 216 to stop J2EE system. In response, the bootstrap program 216 requests the root J2EE server 1052 to stop the root system application, in operation 1402. In operation 1403, the root J2EE server 1052 requests the executive 210, which is root system application's control module, to stop. The executive 210 then requests itself to stop the top user application by using the application stop sequence 1100.

In operation 1405, the executive 210 requests the top user application's control module 306, to stop. In response to the request, the top user application's control module 306 requests the executive 210 to stop child applications, J2EE servers, and the top user applications other modules, in operation 1406. To this end, the top user application's control module 306 uses repeatedly the application stop sequence 1100, the J2EE Server stop sequence 1300, and module stop sequence 1200 to perform this task.

In operation 1407, the top user application's control module 306 reports completion of the stop children request to the executive 210. The executive 210 then requests the root J2EE Server 1052 to deallocate the top user application's control module 306, in operation 1408. In response, the root J2EE Server 1052 disables requests to the top user application's control module 306, in operation 1409, and writes any unsaved recoverable state of the top user application's control module 306 to the state server 614, in operation 1410. Then, in operation 1411, the root J2EE Server 1052 deletes the top user application's control module 306 from its memory, and reports completion to the executive 210, in operation 1412.

Thereafter, in operation 1413, the executive 210 stops child system applications, other root system application's modules, and J2EE servers. The executive 210 uses repeatedly the application stop sequence 1100, J2EE Server stop sequence 1300, and module stop sequence 1200 to perform this task. The executive 210 then, in operation 1414, reports completion of the stop request from operation 1403 above.

In operation 1415, the root J2EE Server 1052 disables requests to the executive 210. The root J2EE Server 1052 then writes any unsaved recoverable state of the executive 210 to the state server 614, in operation 1416, and then deletes the executive 210 from its memory, in operation 1417. Thereafter, the root J2EE Server 1052 reports completion to the bootstrap program 216, in operation 1418.

After receiving the completion report from the root J2EE server 1052, the bootstrap program 216 stops the root J2EE server process backup 1054, in operation 1419. Then, in operation 1420, the bootstrap program 216 stops the root J2EE server process 1052. At this point, the Cluster Framework 602 stops the state server subsystem 614, in operation 1421, and then stops the repository subsystem 606, in operation 1422.

Figure 15:
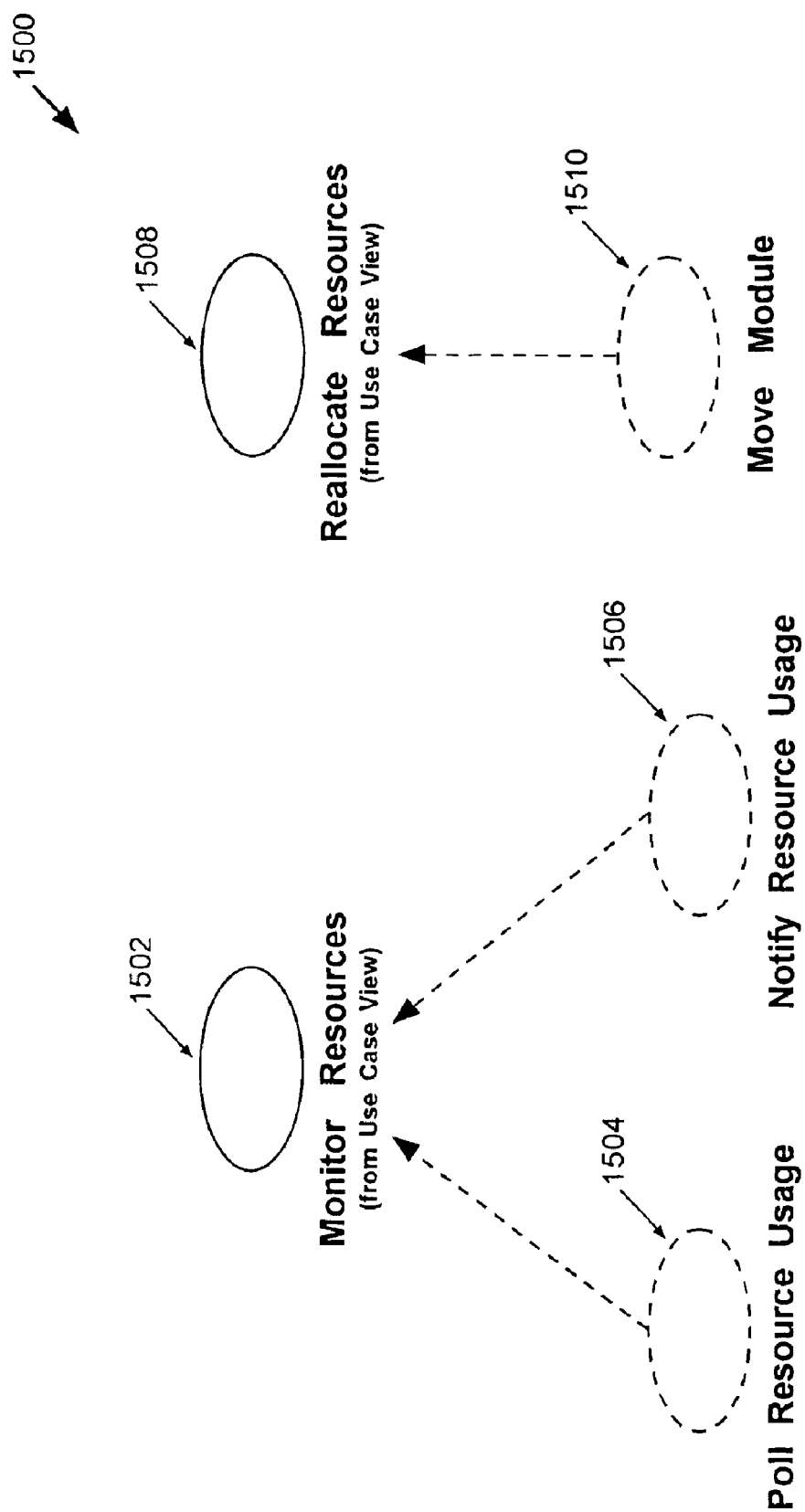
FIG. 15 is a functional diagram showing load balancing operations used by control modules for load balancing a J2EE system, in accordance with an embodiment of the present invention.

In addition, to starting and stopping child applications and modules, the control module of the embodiments of the present invention can perform load balancing of multiple child applications and modules. FIG. 15 is a functional diagram showing load balancing operations 1500 used by control modules for load balancing a J2EE system, in accordance with an embodiment of the present invention. The load balancing operations include monitoring resources functions 1502, such as CPU and memory utilization, and reallocating resources functions 1508.

In operation, a control module makes a request to the system for the status of system resources, shown as polling resource usage functions 1504 in FIG. 15. The request's parameters specify a set of resources of interest to the control module, for example, CPU or memory utilization of a J2EE Server or of an entire node. The system then returns the status of the specified resources. In other embodiments, using notify resource usage functions 1506, a control module can request the system to be notified if the utilization of specified resources exceeds some specified limits instead of polling the status of resources. This notification approach can be used to eliminate wasteful polling.

When necessary, a control module can use reallocate resource functions 1508 to reallocate computing resources to an application's modules. A control module can make a decision how to reallocate the computing resources based on an application-specific policy designed into the control module. The policy can be implemented by the control module itself, or by another application with which the control module communicates, such as a "Load-Balancer" service that monitors the utilization of the computing resources and makes the decisions how the resources should be optimally allocated to the J2EE applications.

When load balancing a J2EE system, a control module can request the system to change the CPU priorities of some modules or J2EE servers to ensure that high-priority applications respond to requests in a bounded time. In addition, an application's control module can request the system to move a module from one J2EE server to another J2EE server located on a different node that has some spare CPU capacity using move module functions 1510.

Figure 16:
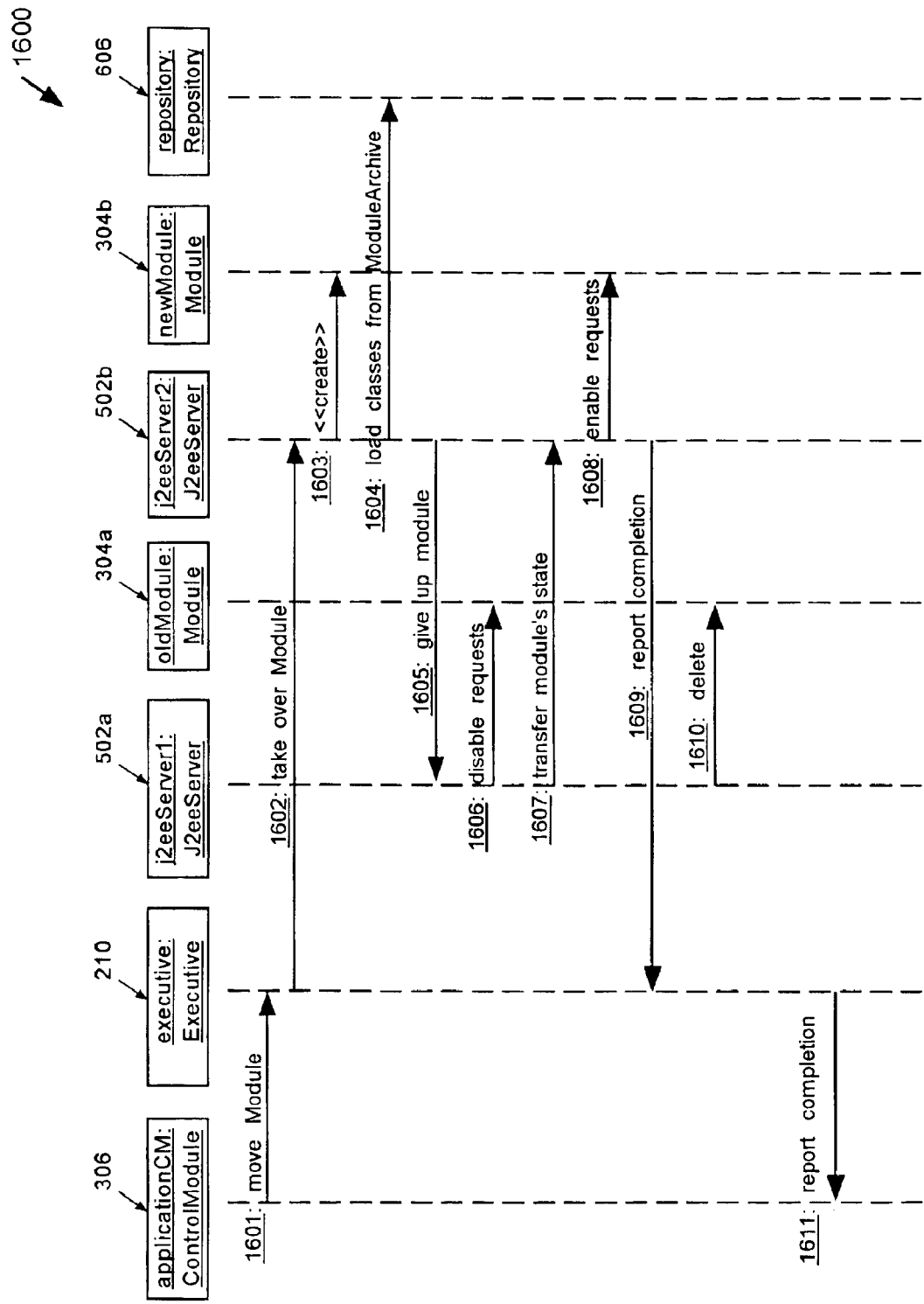
FIG. 16 is a sequence diagram showing a module move sequence, in accordance with an embodiment of the present invention.

FIG. 16 is a sequence diagram showing a module move sequence 1600, in accordance with an embodiment of the present invention. The module move sequence 1600 illustrates how an application's control module 306 moves a service module 304 from a first J2EE server 502a to a second J2EE server 502b.

Initially, in operation 1601, the control module 306 requests the executive 210 to move a first service module 304a from the first J2EE Server 502a to the second J2EE Server 502b. In response, the executive 210 requests the second J2EE Server 502b to take over the allocation of the first service module 304a, in operation 1602. To begin the take over, in operation 1603, the second J2EE Server 502b creates a second service module 502b object and allocates the resources for it. The second J2EE Server 502b then loads the second service module's 304b class files from the repository 606, in operation 1604.

When code for the second service module 304b is ready, in operation 1605, the second J2EE Server 502b requests the first J2EE Server 502a to give up allocation of the first service module 304a. In response to the request, the first J2EE Server 502a disables applications requests to the first service module 304a, in operation 1606. The system will then hold all requests to the first service module 304a. The first J2EE Server 502a then transfers the RSM state of the first service module 304a to the second J2EE Server 502b, which then makes the RSM state available to the second service module 304b, in operation 1607.

In operation 1608, second J2EE Server 502b enables the second service module 304a to receive requests from other modules and external applications. The second J2EE Server 502b then reports completion to the executive 210, in operation 1609, and the first J2EE Server 502a deletes the first service module 304a in operation 1610. Thereafter, in operation 1611, the executive 210 reports completion to control module 306.

As previously mentioned, the embodiments of the present invention can perform failure recovery for Java platforms. Specifically, the embodiments of the present invention can be used in service-provider environments that require the Java platform to mask software failures to the clients using services implemented as Java applications. Using the embodiments of the present invention, a system can quickly recover from software failures, including application failure. Advantageously, the embodiments of the present invention allow recovery to occur generally without any detectable impact on the clients using the application services. Moreover, the embodiments of the present invention preserve the state of the application before the failure after the failure occurs.

When a failure occurs, the system determines, typically using an application-provided error correlator code, which component(s), such as a module or J2EE server, caused the failure. The system then declares the component that caused the error as "failed," and quickly isolates the failed component such that the failure does not spread to other components. Thus, the system makes the component fail-fast. The system then notifies the component's parent control module of the component failure.

Figure 17:
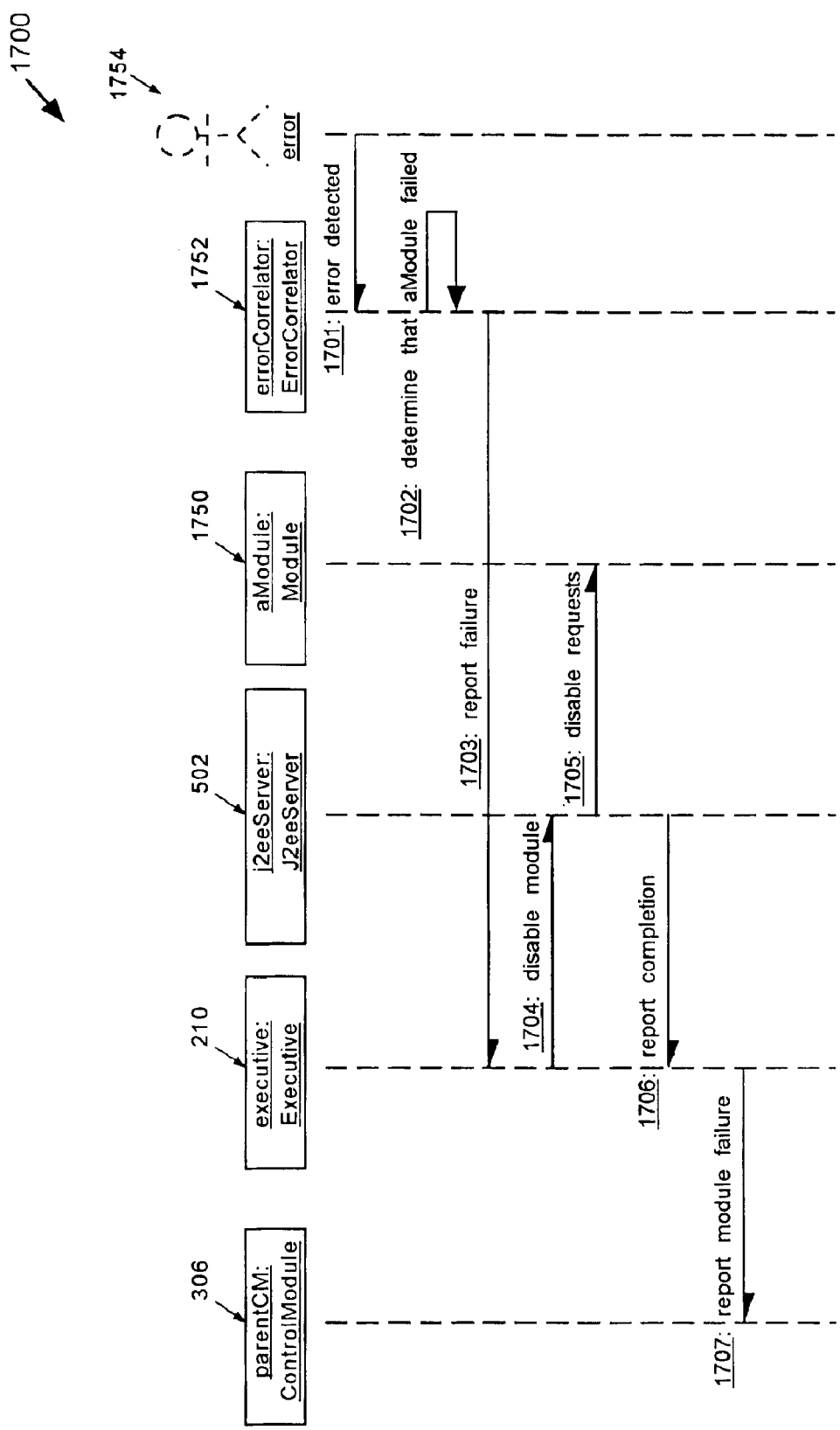
FIG. 17 is a sequence diagram showing a module failure report sequence, in accordance with an embodiment of the present invention.

FIG. 17 is a sequence diagram showing a module failure report sequence 1700, in accordance with an embodiment of the present invention. The module failure report sequence 1700 illustrates the reporting and isolation of a failed module 1750. As shown in FIG. 17, when an error 1754 occurs, the error 1754 is detected and provided to the error correlator 1752, in operation 1701. The error correlator 1752 then, in operation 1702, determines in which component the error 1754 occurred. In this case, the error 1754 occurred in a failed module 1750.

The error correlator 1752 next reports the failure to the executive 210, in operation 1703, including in which component the failure occurred. The executive 210, in operation 1704, then requests the J2EE server 502 executing the failed module 1750 to disable the failed module 1750. In response, the J2EE server 502 disables the failed module 1750, in operation 1705, and reports completion to the executive 210, in operation 1706. Thereafter, in operation 1707, the executive 210 reports the module failure to the parent control module 306.

Figure 18:
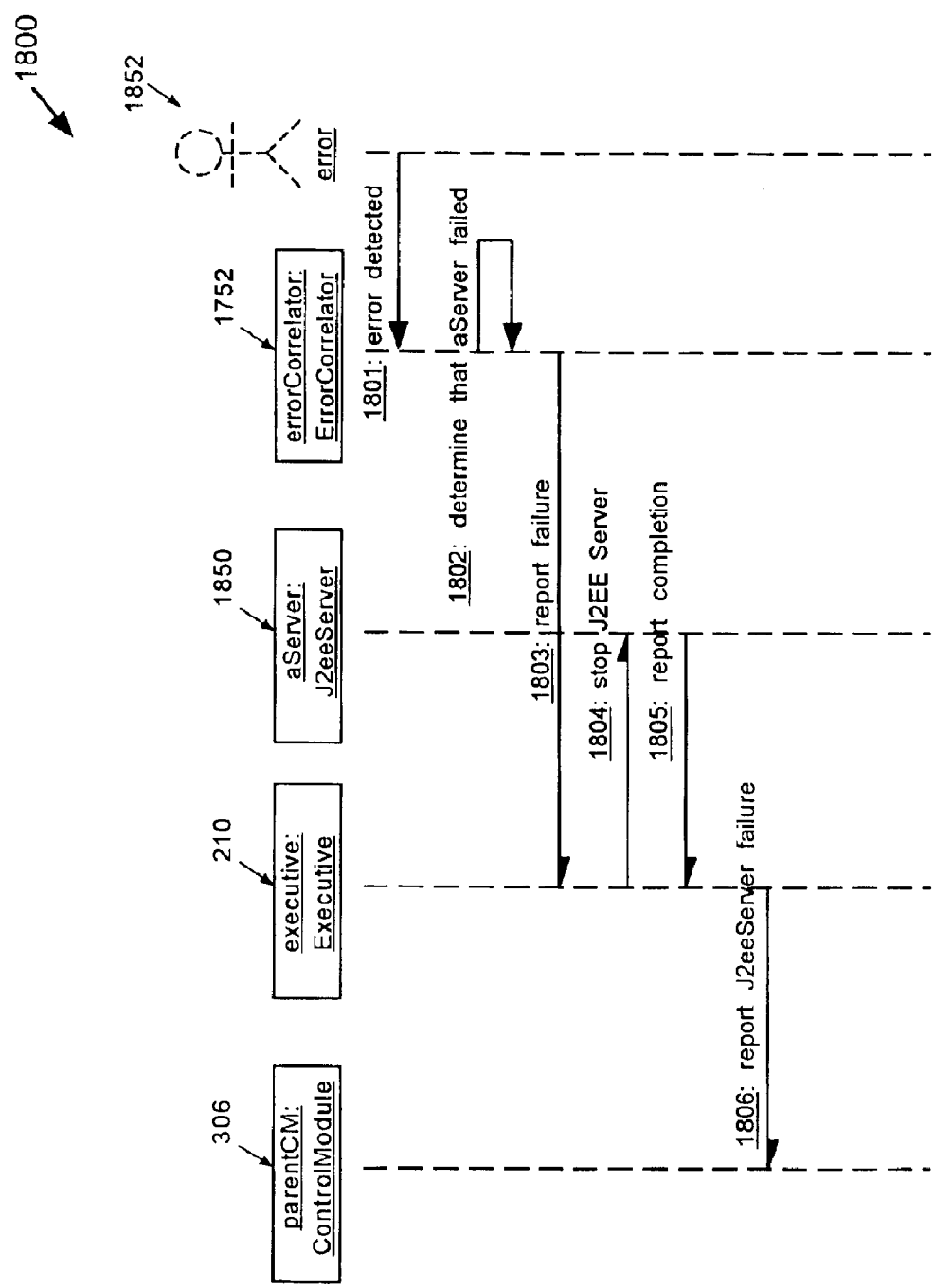
FIG. 18 is a sequence diagram showing a J2EE server failure report sequence, in accordance with an embodiment of the present invention.

FIG. 18 is a sequence diagram showing a J2EE server failure report sequence 1800, in accordance with an embodiment of the present invention. The J2EE server failure report sequence 1800 illustrates the reporting and isolation of a failed J2EE server 1850. When an error 1852 occurs, the error 1852 is detected and provided to the error correlator 1752, in operation 1801. The error correlator 1752 then, in operation 1802, determines in which component the error 1852 occurred. In this case, the error 1852 occurred in a failed J2EE server 1850.

The error correlator 1752 next reports the failure to the executive 210, in operation 1803, including in which component the failure occurred. The executive 210, in operation 1804, then requests the failed J2EE server 1850 to stop execution. The failed J2EE server 1850 then reports completion to the executive 210, in operation 1805, and the executive 210 reports the J2EE server failure to the parent control module 306, in operation 1806.

In addition to modules and J2EE server failures, the embodiments of the present invention also address failures in the root J2EE server, which is the J2EE server executing the root system application. Similar to a module failure, when the system determines that the root J2EE server has failed, the system quickly isolates the failed root J2EE server process such that its failure does not spread to other components. Thus, the system makes the root J2EE server fail-fast. Then, the system notifies the Clustering Framework of the failure.

To recover from a reported failure, the embodiments of the present invention use an applications control module. Broadly speaking, the control module determines which modules are affected by the failure. Next, the control module determines on which nodes, and which J2EE server, the affected modules should be restarted The control module then requests the system to restart the affected modules.

Figure 19:
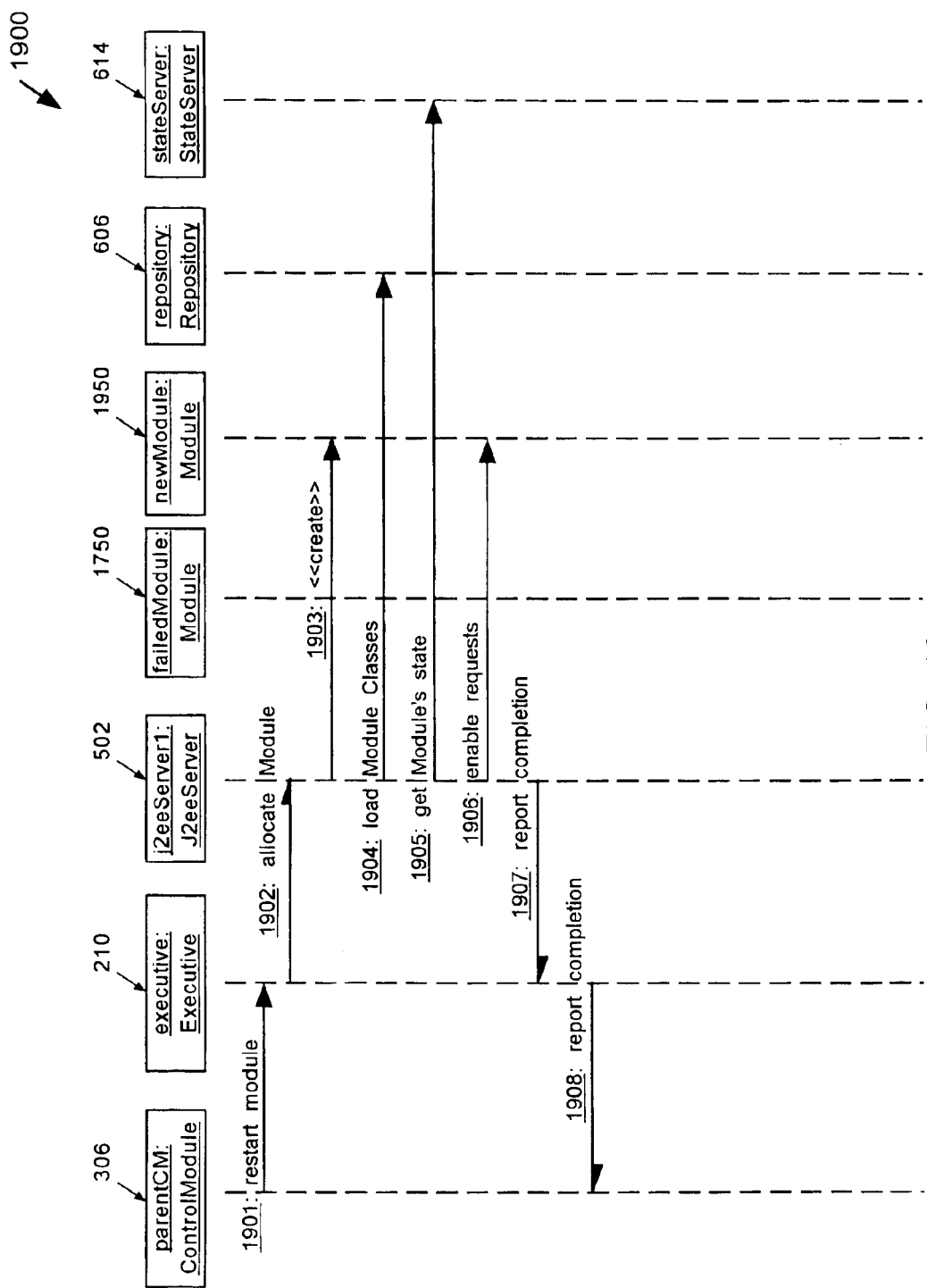
FIG. 19 is a sequence diagram showing a failed module restart sequence, in accordance with an embodiment of the present invention.

FIG. 19 is a sequence diagram showing a failed module restart sequence 1900, in accordance with an embodiment of the present invention. The failed module restart sequence 1900 illustrates how a control module manages the restart of a failed module. In operation 1901, the application's control module 306 requests the executive 210 to restart the failed module 1750. The executive 210 then requests J2EE Server 502 to allocate a new module 1950, in operation 1902.

In operation 1903, the J2EE Server 502 creates the new module 1950 and allocates the data structures that the J2EE server 502 needs to manage the new module 1950 at runtime, and also loads the module's class files from repository 606 into its memory in operation 1904. In operation 1905, the J2EE Server 502 loads the state of the failed module 1750 from State Server 614 into the J2EE Server memory, and enables routing of incoming messages to the new module 1950, in operation 1906. After enabling the routing of incoming messages to the new module 1950, other application modules and external applications can communicate with the new module 1950. The J2EE Server 502 then reports completion of module allocation to the executive 210 in operation 1907, and the executive 210 reports completion of the module restart to the control module 306, in operation 1908.

Figure 20:
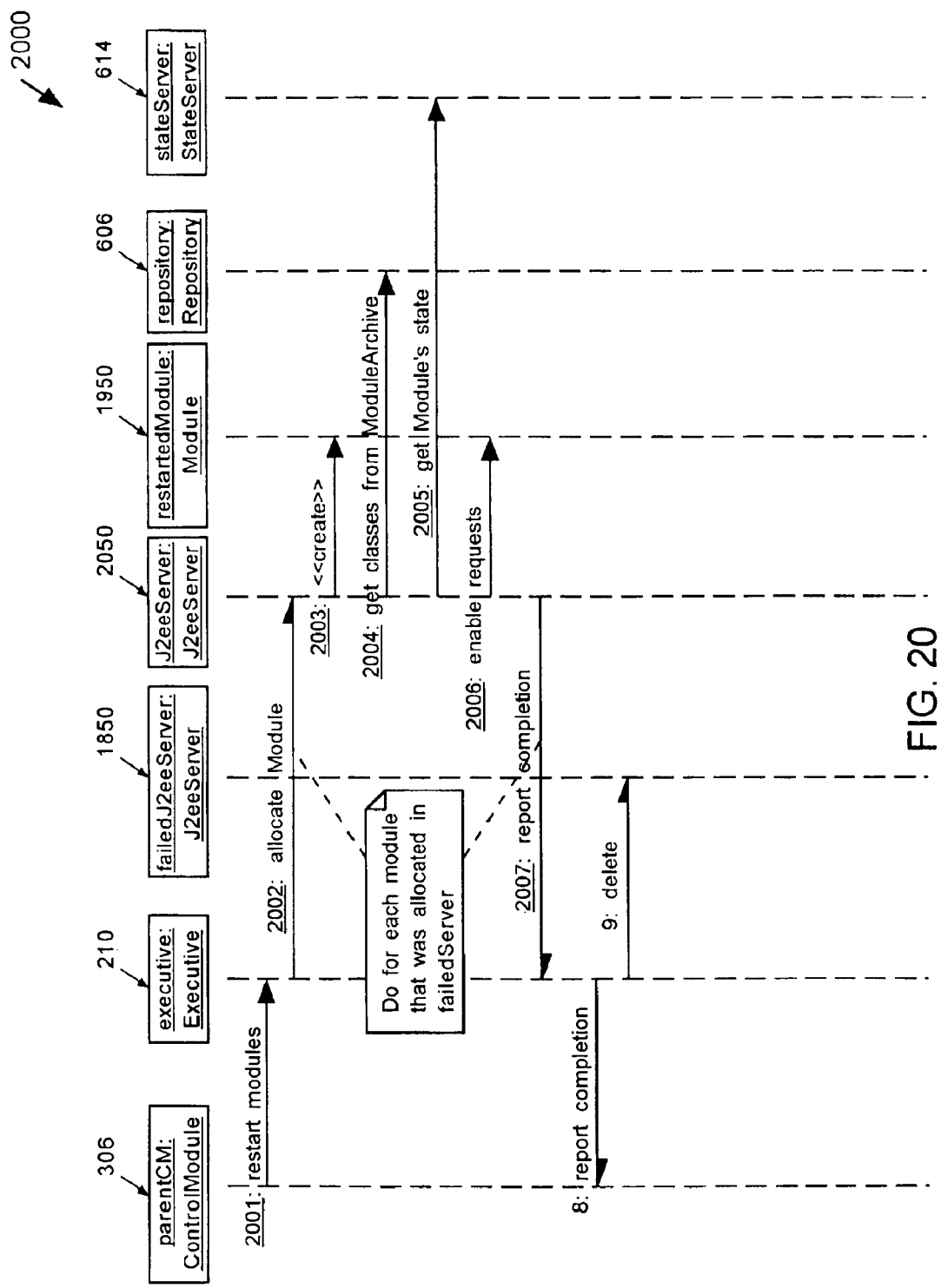
FIG. 20 is a sequence diagram showing a multiple module restart sequence, in accordance with an embodiment of the present invention.

FIG. 20 is a sequence diagram showing a multiple module restart sequence 2000, in accordance with an embodiment of the present invention. The multiple module restart sequence 2000 illustrates how the embodiments of the present invention recover from a J2EE server failure. Generally, all modules executing on the failed J2EE server 1850 are restarted on a new J2EE server 2050. Although FIG. 20 illustrates a situation herein a control module restarts all other modules on a single J2EE server, embodiments of the present invention are also capable of evenly spreading the restarted modules across multiple J2EE servers to better balance the load.

After receiving a failed J2EE server report, the application control module 306 requests the executive 210 to restart the modules of the application on a new J2EE server process 2050, in operation 2001. Then, for each module that is allocated to the failed J2EE server 1850, the executive 210 requests the new J2EE server 2050 to allocate a new module 1950, in operation 2002.

In operation 2003, the new J2EE Server 2050 creates the new module 1950 and allocates the data structures that the J2EE server 2050 needs to manage the new module 1950 at runtime. Also, the new J2EE server 2050 loads the new module's class files from repository 606 into its memory, in operation 2004. In operation 2005, the new J2EE Server 1950 loads the state of the module from State Server 614 into the J2EE Server memory, and enables routing of incoming messages to the new module 1950, in operation 2006. After enabling the routing of incoming messages to the now module 1950, other application modules and external applications can communicate with the new module 1950. The new J2EE Server 2050 then reports completion of module allocation to the executive 210 in operation 2007. Operations 2002–2007 are repeated for each module that was allocated to the failed J2EE server process 1850. Once each module is reallocated to the new J2EE server process 2050, the executive 210 reports completion the control module 306, in operation 2008, and deletes the failed J2EE server process 1850, in operation 2009.

As previously mentioned, FIG. 20 illustrates a situation wherein a control module restarts all other modules on a single J2EE server. To balance the load, embodiments of the present invention can evenly spreading the restarted modules across multiple J2EE servers. In these embodiments, the application control module 306 requests the executive 210 to restart the modules of the application on multiple new J2EE server processes 2050, in operation 2001, based on how the system determines the load should be spread and further based on the application-specific policies provided by the control module 306.

To recover from a failure of the root J2EE server process, the Clustering Framework makes the root J2EE server backup the new root J2EE server. Next, the Clustering Framework requests the new root J2EE server to restart the modules that were allocated to the failed root J2EE server. In response, the root J2EE server restarts the failed modules, and the Clustering Framework creates a new root J2EE server backup process on another node.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for performing failure recovery in a Java platform, comprising the operations of:

executing an application having a service module and a control module, wherein the control module includes application-specific polices for the application;

reporting a detected error in a system component to a runtime executive;

isolating the system component; and notifying the control module of the system component failure, the control module handling recovery from the detected error in accordance with the application-specific policies for the application.

2. A method as recited in claim 1, wherein the system component is the service module.

3. A method as recited in claim 2, wherein isolating the system component includes disabling the service module.

4. A method as recited in claim 1, wherein the system component is a Java server.

5. A method as recited in claim 4, wherein isolating the system component includes stopping execution of the Java server.

6. A method as recited in claim 1, wherein the runtime executive is used to facilitate isolating the system component.

7. A method performing failure recovery in a Java platform, comprising the operations of:

executing an application having a service module and a control module on a first Java server, wherein the control module includes application-specific polices for the application;

detecting an error in a system component;

determining which modules are affected by the detected error using the control module, the control module handling recovery from the detected error in accordance with the application-specific policies for the application; and restarting the modules affected by the detected error on a second Java server using the control module.

8. A method as recited in claim 7, further comprising the operation of allocating a new module for a module affected by the detected error on the second Java server.

9. A method as recited in claim 8, further comprising the operation of loading a state for the new module from a repository.

10. A method as recited in claim 9, wherein the state is a state of the module affected by the detected error.

11. A method as recited in claim 10, further comprising the operation of enabling routing of incoming messages to the new module.

12. A method as recited in claim 11, further comprising the operation of disabling routing of incoming messages to the module affected by the error.

13. A method as recited in claim 12, further comprising the operation of stopping execution of the module affected by the error.

14. A system for performing failure recovery in a Java platform, comprising:

an application having a service module and a control module, wherein the control module includes application-specific polices for the application, the control module handling recovery from a reported error in accordance with the application-specific policies for the application; and;

an error correlator capable of determining which system component includes the reported error; and a runtime executive in communication with the application and the error correlator, wherein the error correlator reports the system component having the reported error to the runtime executive, and wherein the runtime executive isolates the system component.

15. A system as recited in claim 14, wherein the runtime executive notifies the control module of the system component failure.

16. A system as recited in claim 15, wherein the control module determines which modules are affected by the detected error.

17. A system as recited in claim 16, wherein the control module restarts the modules affected by the detected error.

18. A system as recited in claim 17, wherein a new module is created for each module affected by the detected error.

19. A system as recited in claim 18, wherein the new modules are created on a single new Java server.

20. A system as recited in claim 18, wherein the new modules are created on multiple new Java servers.

21. A system as recited in claim 18, further comprising a repository, wherein a state for each of the new modules is loaded from the repository.

22. A system as recited in claim 21, wherein each state is a state of a module affected by the detected error prior to a time when the detected error occurred.

* * * * *